(12) United States Patent
Oue et al.

(10) Patent No.: US 8,593,985 B2
(45) Date of Patent: Nov. 26, 2013

(54) TRANSMITTING APPARATUS, RECEIVING APPARATUS, TRANSMITTING AND RECEIVING SYSTEM, AND TRANSMITTING AND RECEIVING METHOD

(75) Inventors: Nobuaki Oue, Nara (JP); Ryutaro Ono, Tokyo (JP); Eiichi Muramoto, Kanagawa (JP)

(73) Assignee: Panasonic Corporation, Osaka (JP)

( * ) Notice: Subject to any disclaimer, the term of this patent is extended or adjusted under 35 U.S.C. 154(b) by 260 days.

(21) Appl. No.: 13/130,771

(22) PCT Filed: Sep. 29, 2010

(86) PCT No.: PCT/JP2010/005851
§ 371 (c)(1),
(2), (4) Date: May 24, 2011

(87) PCT Pub. No.: WO2011/040006
PCT Pub. Date: Apr. 7, 2011

(65) Prior Publication Data
US 2011/0222431 A1 Sep. 15, 2011

(30) Foreign Application Priority Data
Sep. 30, 2009 (JP) ................................. 2009-227053

(51) Int. Cl.
*G01R 31/08* (2006.01)
(52) U.S. Cl.
USPC ...................................... 370/252; 370/395.41
(58) Field of Classification Search
USPC ........................................... 370/252, 395.41
See application file for complete search history.

(56) References Cited

U.S. PATENT DOCUMENTS

| 7,969,878 | B2* | 6/2011 | Fawaz et al. ............... 370/230.1 |
| 2005/0232227 | A1 | 10/2005 | Jorgenson et al. |
| 2006/0215572 | A1* | 9/2006 | Padhye et al. ................. 370/252 |
| 2009/0059958 | A1 | 3/2009 | Nakata |

FOREIGN PATENT DOCUMENTS

| JP | 2004-254025 | 9/2004 |
| JP | 2006-020110 | 1/2006 |
| JP | 2007-520957 | 7/2007 |
| JP | 2008-258877 | 10/2008 |
| WO | 2007/083687 | 7/2007 |

OTHER PUBLICATIONS

International Search Report issued Dec. 21, 2010 in International (PCT) Application No. PCT/JP2010/005851.

(Continued)

*Primary Examiner* — Sai-Ming Chan
(74) *Attorney, Agent, or Firm* — Wenderoth, Lind & Ponack, L.L.P.

(57) ABSTRACT

A transmitting apparatus accurately estimates an available bandwidth even in a high bandwidth in a network. The transmitting apparatus includes a timer that generates a signal having a signal cycle of a predetermined unit time and a packet train generating unit that generates probe packets each transmitted at the signal cycle, and generates, at least one adjustment packet inserted between two of the probe packets, the number of which corresponds to a measurement The apparatus also includes a transmitting unit that transmits, at the signal cycle, each probe packet having transmission time information, and the adjustment packet between the two probe packets, a receiving unit which receives, from a receiving apparatus, return information obtainable based on a reception time of each probe packet and a determining unit that determines the available bandwidth, using the received return information.

15 Claims, 16 Drawing Sheets

(56) References Cited

OTHER PUBLICATIONS

Cao Le Thanh Man et al., "An Inline Network Measurement Mechanism for High-Speed Networks", IEICE Technical Report, vol. 105. No. 472, The Institute of Electronics, Information and Communication Engineers. Dec. 8, 2005, pp. 79-84.

Jain, Manish et al., "Pathload: A Measurement Tool for End-to-end Available Bandwidth", in Proceedings of Passive and Active Measurements (PAM) Workshop, 2002.

V. J. Ribeiro et al., "PathChirp: Efficient Available Bandwidth Estimation for Network Paths.", V. J. Ribeiro. R. H. Riedi, R. G. Baraniuk, J. Navratil, and L. Cottrell., in Passive and Active Measurements Workshop, 2003.

\* cited by examiner

TRANSMITTING APPARATUS, RECEIVING APPARATUS, TRANSMITTING AND RECEIVING SYSTEM, AND TRANSMITTING AND RECEIVING METHOD

TECHNICAL FIELD

The present invention relates to a transmitting apparatus, a receiving apparatus, a transmitting and receiving system, and a transmitting and receiving method for estimating a bandwidth (available bandwidth) that can be used between two terminals connected via a network.

BACKGROUND ART

Streaming communication is sometimes performed in which data sequences like audio visual data etc. are sequentially transmitted between terminals via a network such as the Internet. In such a case, there is a need to estimate an available bandwidth in order to determine the transmission rate of a stream before starting the communication. As representative methods, NPL 1 and NPL 2, and PTL 1 are known.

Each of the methods is for estimating an available bandwidth using probe packets. Each of the methods compares a transmission interval and a reception interval of two of the probe packets, and when the comparison shows that the reception interval is longer than the transmission interval, judging the current bandwidth to be unavailable.

In PTL 1, a transmitting terminal transmits a packet train composed of plural packets with a transmission time stamp, to a receiving terminal at a certain interval according to an inverse number of the bandwidth of which the availability is judged. The receiving terminal receives the packet train, and calculates, for each of the packets, an OWD (One Way Delay) based on the reception time and the transmission time of the packet. The receiving terminal judges whether or not the bandwidth is available for the packet train composed of packets transmitted at predetermined intervals, based on whether or not the one way delay(s) increase(s). When the one way delay(s) increase(s), the receiving terminal judges the bandwidth to be unavailable.

In NPL 2, a transmitting terminal transmits plural packets with a transmission time stamp in a packet sequence, to a receiving terminal at reduced intervals (hereinafter, this transmission scheme is referred to as Chirp). The receiving terminal observes whether or not there is an increase in the one way delay(s) as in PTL 1. The receiving terminal judges regarding, as the upper limit threshold value, the transmission bandwidth of the packet at the time at which the one way delay starts to increase (the transmission bandwidth corresponds to the product of the packet size and the inverse number of the packet transmission interval).

In PTL 1, a transmitting terminal transmits a packet similar to a packet used in the aforementioned Chirp, and a receiving terminal estimates an available bandwidth using information regarding the increase in one way delay(s).

According to these conventional approaches, it is possible to estimate the available bandwidth that is a bandwidth that can be used between two terminals connected through a network.

CITATION LIST

Patent Literature

[PTL 1]
Japanese Laid-open Patent Application Publication No. 2004-254025

Non Patent Literature

[NPL 1]
"Pathload: A Measurement Tool for End-to-end Available Bandwidth", Jain, Manish and Dovrolis, Constantinos, in Proceedings of Passive and Active Measurements (PAM) Workshop, 2002

[NPL 2]
"PathChirp: Efficient Available Bandwidth Estimation for Network Paths.", V. J. Ribeiro, R. H. Riedi, R. G. Baraniuk, J. Navratil, and L. Cottrell., in Proceedings of Passive and Active Measurements Workshop, 2003

SUMMARY OF INVENTION

Technical Problem

Here, each of the above-described conventional approaches requires that a transmitting terminal is capable of transmitting packets with a specified accurate timing. In other words, there is a need to accurately transmit each of the packets in a packet train at shorter packet transmission intervals in the case of transmitting a high-bandwidth packet train or the last half (high bandwidth portion) of the packet train as transmitted in Chirp.

However, the transmission interval is normally controlled by a timer signal cycle. A low-performance embedded device cannot increase the frequency of its timer (cannot reduce the cycle of its timer) because the processing load increases. For this reason, in each of the above-described conventional approaches, the transmission interval of a packet cannot be reduced and thus it is impossible to accurately estimate an available bandwidth in a high bandwidth.

This is described below in detail. It is assumed that here is a low-performance CPU for use in an embedded device and having a low timer frequency, and the CPU can drive the timer, for example, at as low as 250 Hz. In this case, the minimum transmission interval that can be controlled accurately is 4 ms that is the inverse number of the timer frequency. In the case of constructing a packet train using 1000-byte packets and transmitting each of the packets at a 4-ms interval, the maximum bandwidth that can be judged is 2 Mbps.

In other words, 2 Mbps is the upper limit for the bandwidth measurable using a packet train that can be generated by a terminal that cannot accurately control the transmission interval of a packet if the transmission interval is smaller than a unit time of 4 ms. Accordingly, even when any one of the above-described approaches is applied, it is impossible to accurately judge whether or not a bandwidth is an available bandwidth in a bandwidth of 2 Mbps or higher.

Furthermore, in the case of a transmission interval smaller than the minimum transmission interval, it is impossible to transmit a packet train with accurate transmission timing. In other words, the transmission interval smaller than the minimum transmission interval cannot be accurately controlled depending on the processing state of the CPU, and thus the transmission interval randomly increases or decreases.

In the case where the transmission interval is larger than the minimum transmission interval, a current packet is output to the network with a delay from an intended time and reaches the receiving terminal through the network. The one way delay that is observed in this case is the one way delay including the delay before entrance to the network, instead of the one way delay that should be originally observed as being the one way delay that occurs when passing through the network. In the opposite case where the transmission interval is smaller than the intended minimum transmission interval, a current packet is output to the network before an intended time. The one way delay that is observed in this case is shorter than the one way delay that should be originally observed as being the one way delay that occurs when passing through the network.

As a result, the one way delays observed by the receiving terminal vary in terms of increase and decrease from the correct one way delays. This disables an accurate judgment on the availability of a measurement bandwidth. Depending on a judgment procedure, this may lead to causing the transmitting terminal to perform another trial using a packet train including packets that are transmitted at the same transmission intervals. This results in problems that the measurement time required for the judgment increases and a misjudgment is made.

As described above, each of the approaches cannot accurately estimate an available bandwidth in a high bandwidth.

The present invention has been conceived in view of these problems, with an aim to provide a transmitting apparatus, a receiving apparatus, a transmitting and receiving system, and a transmitting and receiving method for accurately estimating an available bandwidth in a network even in the case of a high bandwidth.

Solution to Problem

In order to achieve the aforementioned object, a transmitting apparatus according to an aspect of the present invention is intended to estimate an available bandwidth that is a bandwidth that can be used for data communication with a receiving apparatus, the transmitting apparatus including: a timer unit that generates a signal having a signal cycle corresponding to a predetermined unit time; a packet train generating unit that generates probe packets each of which is transmitted at the signal cycle corresponding to the unit time indicated by the signal, and generate, as at least one adjustment packet that is inserted between two of the probe packets, at least one adjustment packet the number of which corresponds to a measurement bandwidth that is a target bandwidth to be measured; a transmitting unit that transmits, at the signal cycle corresponding to the unit time, each of the probe packets each having transmission time information that is information identifying a transmission time, and transmit the at least one adjustment packet between when one of the two probe packets is transmitted and when the other one is transmitted; a receiving unit that receives, from the receiving apparatus, return information that is information obtainable based on a reception time of each of the probe packets received by the receiving apparatus; and a determining unit that determines the available bandwidth, using the received return information.

With this structure, the transmitting apparatus generates the probe packets including the transmission time information and the at least one adjustment packet, transmits each of the probe packets at the signal cycle corresponding to the unit time, transmits the adjustment packet between when one of the two probe packets is transmitted and when the other one is transmitted, receives the return information obtainable based on the reception time of each of the packets by the receiving apparatus, and determines the available bandwidth using the return information. In other words, a greater number of packets must be transmitted in a higher measurement bandwidth, and thus many adjustment packets are inserted between the probe packets and then transmitted. The probe packets each of which is transmitted at the timer signal cycle are used to determine the available bandwidth. In this way, it is possible to accurately measure the available bandwidth in the network by performing the measurement using the packet train with consideration of the timer signal cycle (the minimum controllable transmission interval). In other words, even a weak CPU for use in an embedded device accurately transmits each of the probe packets at the minimum controllable transmission interval. In this way, it is possible to measure the delay time more accurately, which makes it possible to measure the available bandwidth more accurately. Furthermore, even the weak CPU for use in the embedded device transmits the at least one adjustment packet not for use in the measurement of the delay time and thus no accurate control of the transmission time is performed therefor. In this way, it is possible to accurately estimate the available bandwidth even in the high bandwidth in the network.

In addition, it is preferable that the receiving unit receive, from the receiving apparatus, the return information including either information indicating the reception time of each of the probe packets or information indicating a delay time that is a difference between the transmission time and the reception time of each of the probe packets, the determining unit include a judging unit that judges whether or not the measurement bandwidth is an available bandwidth, using either the information indicating the reception time or the information indicating the delay time included in the received return information, and that the determining unit determine the available bandwidth, based on a result of the judgment by the judging unit.

In this way, whether or not the measurement bandwidth is an available bandwidth is judged using either the information indicating the reception time of each of the probe packets or the information indicating the delay time included in the received return information, and the available bandwidth is determined based on the result of the judgment. In other words, the transmitting apparatus judges on the available bandwidth based on the return information, and thereby the transmitting apparatus can judge the availability of the bandwidth desired to be finally measured. As a result, it is possible to estimate the available bandwidth in the high bandwidth more accurately, irrespective of the unit time based on which each of the packets can be controlled.

In addition, the receiving unit may receive, from the receiving apparatus, the return information including a result of judging whether or not the measurement bandwidth is an available bandwidth, using the reception time of each of the probe packets, and the determining unit may determine the available bandwidth, based on the judgment result included in the received return information.

In this way, the transmitting apparatus receives, from the receiving apparatus, the return information including the result of judging whether or not the measurement bandwidth is the available bandwidth, and determines the available bandwidth based on the judgment result included in the received return information. For this reason, the transmitting apparatus can determine the available bandwidth based on the return information, without making any judgment on the available bandwidth. As a result, it is possible to estimate the available bandwidth in the high bandwidth more accurately, irrespective of the unit time based on which each of the packets can be controlled.

In addition, it is preferable that the packet train generating unit determine the number of the probe packets and the number of the at least one adjustment packet, according to the unit time and the measurement bandwidth, and generate the determined numbers of the probe packets and the adjustment packet.

In this way, the transmitting apparatus determines the number of the probe packets and the number of the adjustment packet, based on the unit time and the measurement bandwidth, and generates the determined numbers of the probe packets and the adjustment packet(s). In other words, since the number of the probe packets and the number of the adjustment packet vary depending on the unit time and the measurement bandwidth, the numbers are determined first, and then the determined numbers of the probe packets and the adjustment packet(s) are generated. In this way, even in the high measurement bandwidth, it is possible to accurately estimate the available bandwidth in the network by adjusting the number of the probe packets and the adjustment packet(s).

In addition, it is preferable that the transmitting apparatus further include a controller that determine, each time the determining unit determines the available bandwidth, a next target measurement bandwidth to be measured, based on a result of the determination of the available bandwidth, wherein the packet train generating unit determine the number of the probe packets and the number of the at least one adjustment packet, each time the controller determines the measurement bandwidth, and generate the determined numbers of the probe packets and the adjustment packet, the transmitting unit transmit the probe packets and the at least one adjustment packet to the receiving apparatus, each time the packet train generating unit generates the probe packets and the at least one adjustment packet, the receiving unit receive the return information from the receiving apparatus, each time the transmitting unit transmits the probe packets and the at least one adjustment packet, and that the determining unit determine the available bandwidth, each time the receiving unit receives the return information.

In this way, an available bandwidth is repeatedly determined by shifting to a next target measurement bandwidth to be measured such that a new target measurement bandwidth is repeatedly determined each time an available bandwidth is determined. In this way, it is possible to search out the available bandwidth in a predetermined measurement bandwidth range.

Furthermore, in order to achieve the aforementioned object, a transmitting apparatus according to an aspect of the present invention is intended to estimates an available bandwidth that is a bandwidth that can be used for data communication with a receiving apparatus, the transmitting apparatus including: a timer unit that generates a signal having a signal cycle corresponding to a predetermined unit time; a packet train generating unit that generates probe packets each of which is transmitted at the signal cycle corresponding to the unit time indicated by the signal, and has a data size corresponding to a measurement bandwidth that is a target bandwidth to be measured; a transmitting unit that transmits each of the probe packets each including transmission time information that is information identifying a transmission time, to the receiving apparatus at the signal cycle corresponding to the unit time; a receiving unit that receives, from the receiving apparatus, return information that is information obtainable based on the reception time of each of the probe packets received by the receiving apparatus; and a determining unit that determines the available bandwidth, using the received return information.

In this way, the transmitting apparatus generates probe packets each having a data size corresponding to the measurement bandwidth, transmits each of the probe packets at the signal cycle corresponding to the unit time, receives the return information, and determines the available bandwidth using the return information. For this reason, it is possible to transmit, at the signal cycle corresponding to the unit time, each of the probe packets each having the data size according to the measurement bandwidth, receive the return information obtainable based on the reception time of each of the probe packets, thereby calculating the delay time of each of the probe packets. Thus, it is possible to determine the available bandwidth based on the delay time. In this way, even the weak CPU for use in the embedded device accurately transmits each of the probe packets at the minimum controllable transmission interval. In this way, it is possible to measure the delay time more accurately, which makes it possible to measure the available bandwidth more accurately. For this reason, even in the high bandwidth, it is possible to accurately estimate the available bandwidth in the network.

Furthermore, in order to achieve the aforementioned object, a receiving apparatus according to an aspect of the present invention is intended to receive a packet train composed of a plurality of packets from a transmitting apparatus, and is used to estimate an available bandwidth that is a bandwidth that can be used for data communication with a transmitting apparatus, the receiving apparatus including: a reception time measuring unit that measures at least a reception time of each of probe packets (i) included in the plurality of packets, (ii) transmitted at the signal cycle corresponding to the predetermined unit time, and (iii) including transmission time information that is information identifying a transmission time; a packet extracting unit that extracts the probe packets from among the plurality of packets; and a transmitting unit that returns, to the transmitting apparatus, the return information that is obtainable based on the reception time of each of the probe packets and is for determining the available bandwidth.

With this structure, the receiving apparatus measures the reception time of each of the probe packets which is transmitted at the signal cycle corresponding to the unit time and includes transmission time information, extracts the probe packets, and returns, to the transmitting apparatus, the return information obtainable based on the reception time of each of the probe packets. In other words, the number of the plural packets received from the transmitting apparatus corresponds to the measurement bandwidth, and thus the receiving apparatus extracts the probe packets each transmitted at the timer signal cycle, and returns, to the transmitting apparatus, the return information regarding the probe packets. In this way, the transmitting apparatus can determine the available bandwidth using the return information. In this way, it is possible to accurately measure the available bandwidth in the network by performing the measurement using the packet train with consideration of the timer signal cycle (the minimum controllable transmission interval). In other words, even in the high bandwidth, the transmitting apparatus can accurately estimate the available bandwidth in the network by returning, to the transmitting apparatus, the information indicating the reception time of each of the probe packets.

In addition, it is preferable that the transmitting unit that returns, to the transmitting apparatus, the return information including either information indicating the reception time of each of the probe packets or information indicating a delay time that is a difference between the transmission time and the reception time of each of the probe packets.

In this way, the receiving apparatus returns, to the transmitting apparatus, the return information including either the information indicating the reception time of each of the probe packets or the information indicating the delay time. In this way, the transmitting apparatus can judge whether or not the measurement bandwidth is an available bandwidth based on either the information indicating the reception time of each of the probe packets or the information indicating the delay time included in the received return information, and determine the available bandwidth using the result of the judgment. For this reason, the transmitting apparatus can accurately estimate the available bandwidth even in the high bandwidth in the network.

In addition, it is preferable that the receiving apparatus further include a judging unit that judges whether or not a measurement bandwidth that is a target bandwidth to be measured is an available bandwidth, based on the delay time that is the difference between the transmission time and the reception time of each of the probe packets extracted by the packet extracting unit, wherein the transmitting unit preferably returns, to the transmitting apparatus, the return information including a result of the judgment by the judging unit.

In this way, the receiving apparatus judges whether or not the measurement bandwidth is an available bandwidth based on the delay time of each of the probe packets, and returns, to the transmitting apparatus, the return information including the judgment result. In this way, the transmitting apparatus can know the result of the judgment on the availability of the measurement bandwidth to be finally measured. As a result, the transmitting apparatus can accurately estimate the available bandwidth in the high bandwidth, irrespective of the unit time based on which each of the packets can be controlled.

It is to be noted that the present invention can be implemented not only as the transmitting apparatus and the receiving apparatus as described above, but also as a transmitting and receiving system including the transmitting apparatus and the receiving apparatus and intended to estimate an available bandwidth in a network between these two terminals. Furthermore, the present invention can be implemented as a method including the steps corresponding to the unique processing units in the transmitting apparatus, the receiving apparatus, and/or the transmitting and receiving system. Furthermore, the present invention may be implemented as a program causing a computer to execute these steps. Furthermore, the present invention may be implemented as a computer-readable recording medium such as a CD-ROM including the program recorded thereon, and as information, data or a signal representing the program. These program, information, data and signal may be distributed through a communication network such as the Internet. Furthermore, the present invention can be implemented as an integrated circuit including processing units that make up the transmitting apparatus and/or the receiving apparatus.

Advantageous Effects of Invention

A transmitting apparatus, a receiving apparatus, a transmitting and receiving system, and a transmitting and receiving method make it possible to accurately estimate an available bandwidth even in a high bandwidth in a network.

DESCRIPTION OF EMBODIMENTS

Embodiments of the present invention are described below in detail with reference to the drawings.

Embodiment 1

Figure 1:
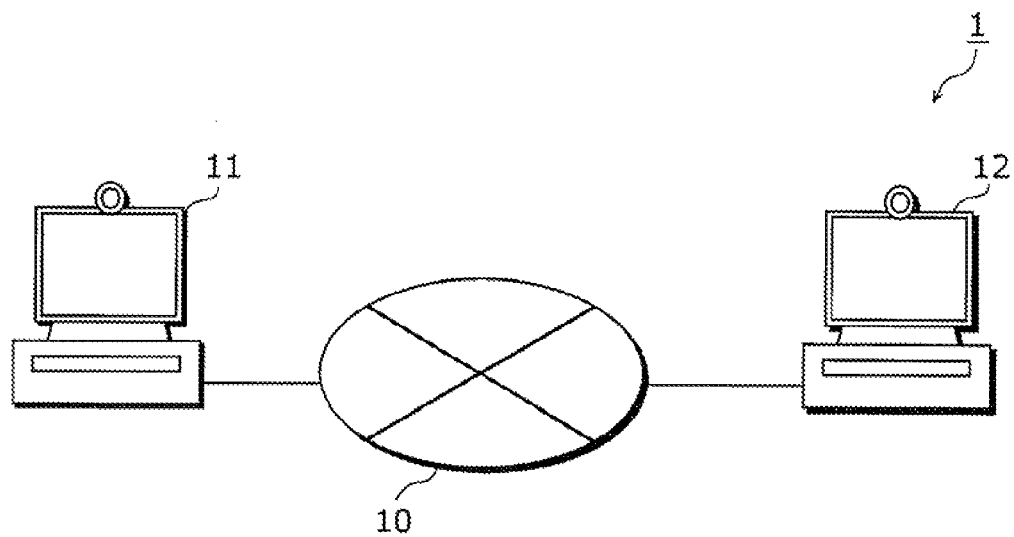
FIG. 1 is a diagram showing a structure of a transmitting and receiving system in Embodiment 1.

FIG. 1 is a diagram showing a structure of a transmitting and receiving system 1 in Embodiment 1 of the present invention.

The transmitting and receiving system 1 is a system intended to estimate an available bandwidth that is a bandwidth that can be used for transmitting and receiving data between a transmitting apparatus and a receiving apparatus. As shown in the diagram, the transmitting and receiving system 1 includes a transmitting terminal 11 that is the transmitting apparatus, a receiving terminal 12 that is the receiving terminal, and a communication network 10.

The transmitting terminal 11 transmits a packet train composed of plural packets to the receiving terminal 12 via the communication network 10. Furthermore, the transmitting terminal 11 receives return information from the receiving terminal 12, and estimates the available bandwidth.

The receiving terminal 12 transmits the return information that is information for estimating the available bandwidth to the transmitting terminal 11 via the communication network 10.

Figure 2:
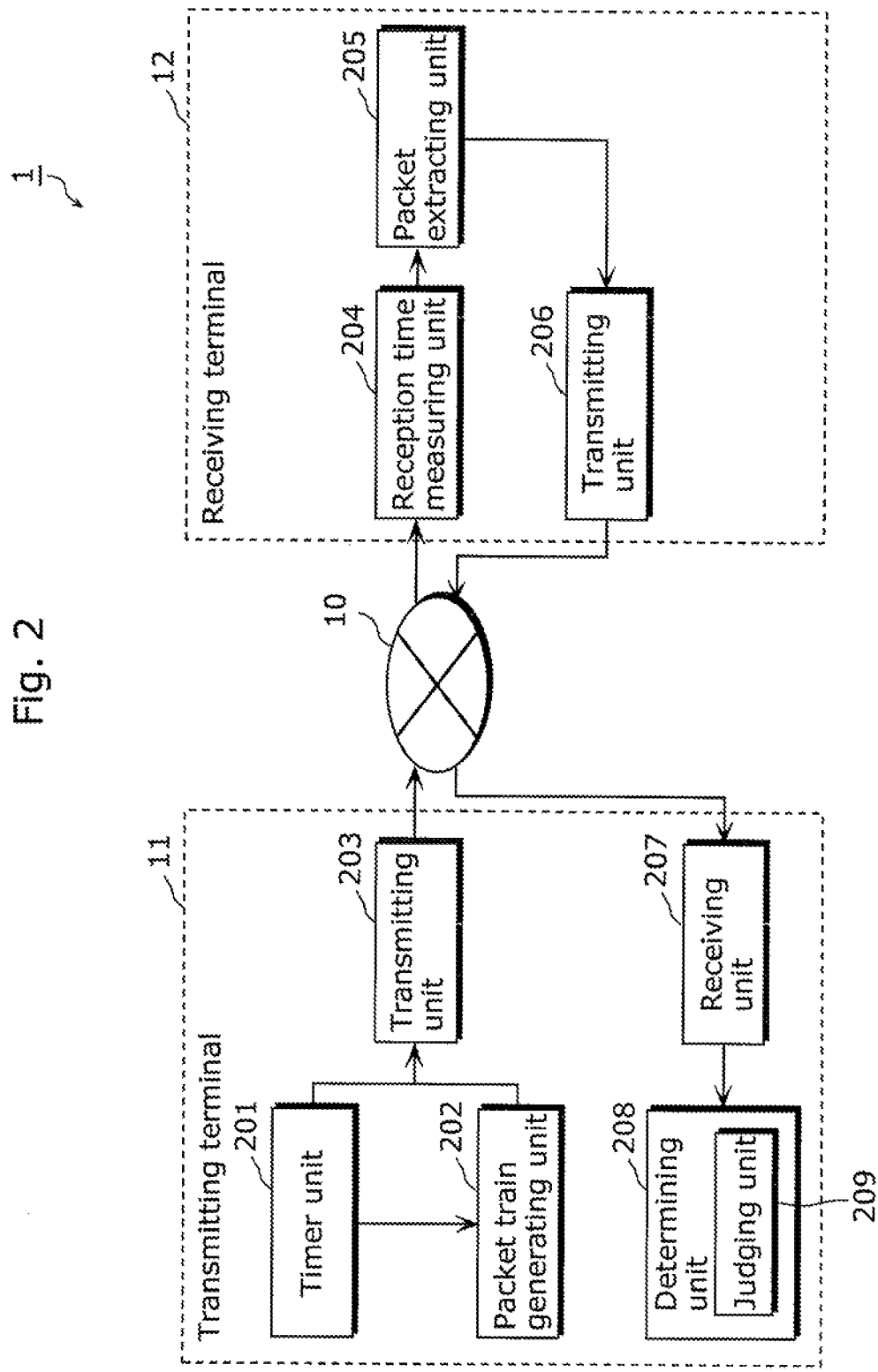
FIG. 2 is a block diagram showing functional structures of a transmitting terminal and a receiving terminal in the transmitting and receiving system in Embodiment 1.

FIG. 2 is a block diagram showing functional structures of the transmitting terminal 11 and the receiving terminal 12 in the transmitting and receiving system 1 in Embodiment 1 of the present invention.

As shown in the diagram, the transmitting terminal 11 includes a timer unit 201, a packet train generating unit 202, a transmitting unit 203, a receiving unit 207, and a determining unit 208. On the other hand, the receiving terminal 12 includes a reception time measuring unit 204, a packet extracting unit 205, and a transmitting unit 206.

The timer unit 201 generates a signal having a signal cycle corresponding to a predetermined unit time, on the operating system of the transmitting terminal 11.

The packet train generating unit 202 obtains, from the timer unit 201, the unit time that is an interval of the signal, and generates a packet train including plural probe packets and if necessary further including at least one adjustment packet, depending on the unit time and the measurement bandwidth.

The packet train generating unit 202 generates probe packets each of which is transmitted at the signal cycle corresponding to the unit time indicated by the signal generated by the timer unit 201 and corresponding to the unit time, and generates at least one adjustment packet the number of which corresponds to the measurement bandwidth that is the target bandwidth to be measured, as at least one adjustment packet that is inserted between two of the probe packets. Here, the packet train generating unit 202 determines the number of the probe packets and the number of the adjustment packet(s), based on the unit time and the measurement bandwidth, and generates the determined numbers of the probe packets and the adjustment packet(s).

The transmitting unit 203 of the transmitting terminal 11 transmits, at the signal cycle corresponding to the unit time, the probe packets each of which includes transmission time information identifying a transmission time, and transmits the adjustment packet between when one of two probe packets is transmitted and when the other one is transmitted. In other words, the transmitting unit 203 assigns the transmission time information to each of the probe packets and the adjustment packet generated by the packet train generating unit 202, transmits the probe packets at the interval corresponding to the unit time for the timer unit 201, and transmits the adjustment packet between when one of the two consecutive probe packets is transmitted and when the other one is transmitted.

The reception time measuring unit 204 measures at least the reception time of each of the probe packets among the plural packets that are transmitted from the transmitting terminal 11. The reception time measuring unit 204 receives the packet train composed of the plural packets transmitted from the transmitting terminal 11, and measures and records the reception time of each of the packets.

Here, the reception time measuring unit 204 receives the packet train from the transmitting terminal 11, and measures the reception time of each of the packet. However, it is to be noted that the reception time measuring unit 204 may measure the reception time of each of probe packets that are extracted by the packet extracting unit 205. In this case, the reception time measuring unit 204 may not measure the reception time of each of the at least one adjustment packet.

The packet extracting unit 205 of the receiving terminal 12 extracts the probe packets from among the plural packets included in the packet train.

The transmitting unit 206 of the receiving terminal 12 returns, to the transmitting terminal 11, return information that is information for determining an available bandwidth. The return information is obtainable based on the reception time of each of the probe packets. In Embodiment 1, the transmitting unit 206 returns, to the transmitting terminal 11, return information including either information indicating the reception time of each of the probe packets or information indicating a delay time that is the difference between the transmission time and the reception time of each of the probe packets.

The receiving unit 207 receives, from the receiving terminal 12, the return information that is the information obtainable based on the reception time of each of the probe packets received by the receiving terminal 12. In Embodiment 1, the receiving unit 207 receives, from the receiving terminal 12, the return information including either the information indicating the reception time of each of the probe packets or the information indicating the delay time that is the difference between the transmission time and the reception time of each of the probe packets.

The determining unit 208 determines the available bandwidth using the return information received by the receiving unit 207. In Embodiment 1, the determining unit 208 includes a judging unit 209 that judges whether or not a current measurement bandwidth is an available bandwidth. In other words, the determining unit 208 determines the available bandwidth based on the result of a judgment by the judging unit 209.

Here, the judging unit 209 judges whether or not the current measurement bandwidth is an available bandwidth using the return information including either the information indicating the reception time of each of the probe packets or information indicating the delay time.

Figure 3:
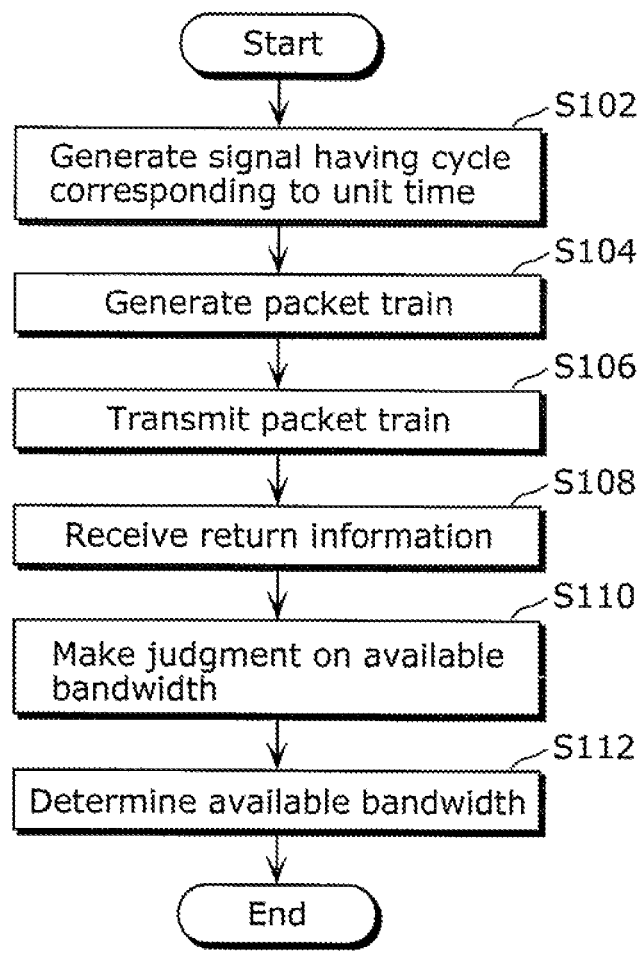
FIG. 3 is a flowchart of exemplary processes performed by the transmitting terminal in Embodiment 1.
Figure 4:
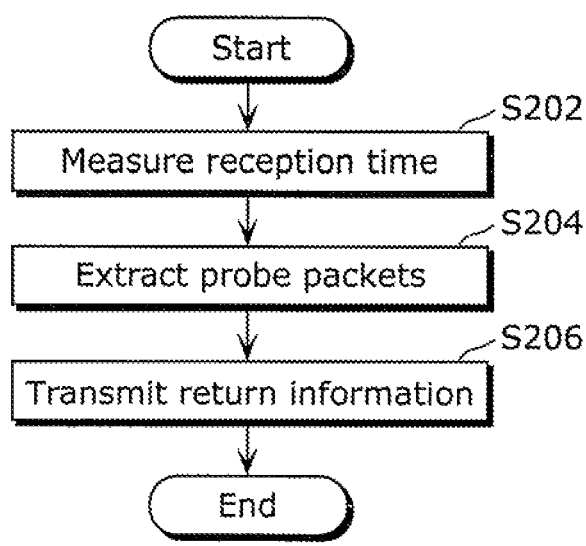
FIG. 4 is a flowchart of exemplary processes performed by the receiving terminal in Embodiment 1.
Figure 5:
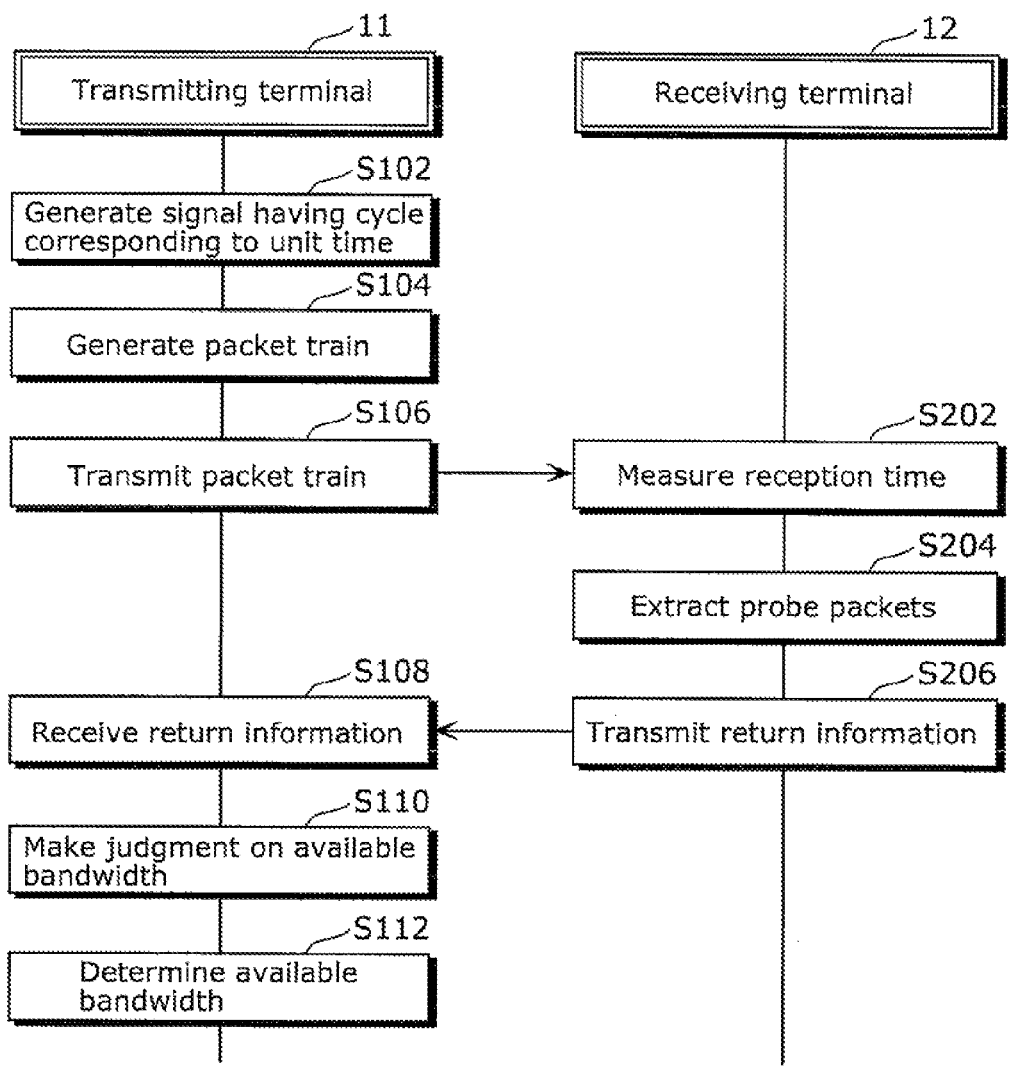
FIG. 5 is a sequence diagram showing the relationship between the processes performed by the transmitting terminal and the processes performed by the receiving terminal in Embodiment 1.

Next, with reference to FIG. 3 to FIG. 5, descriptions are given of processes performed by the transmitting and receiving system 1 to estimate an available bandwidth.

FIG. 3 is a flowchart of exemplary processes performed by the transmitting terminal 11 in Embodiment 1. The processes performed by the transmitting terminal 11 are described with reference to FIG. 3.

FIG. 4 is a flowchart of exemplary processes performed by the receiving terminal 12 in Embodiment 1. The processes performed by the receiving terminal 12 are described with reference to FIG. 4.

FIG. 5 is a sequence diagram showing the relationship between the processes performed by the transmitting terminal 11 and the processes performed by the receiving terminal 12 in Embodiment 1.

First, as shown in FIG. 3, the timer unit 201 generates a signal having a signal cycle corresponding to a predetermined unit time (S102). Here, the predetermined unit time is the minimum time interval controllable by the timer unit 201, and the minimum interval that allows accurate control of the transmission of packets. For example, in the case where the timer unit 201 operates at 250 Hz, the predetermined unit time is 4 ms. It is to be noted that the predetermined unit time is not limited to the minimum time interval, and may be any other time interval controllable by the timer unit 201.

The packet train generating unit 202 generates a packet train composed of probe packets and at least one adjustment packet (S104). In other words, the packet train generating unit 202 generates probe packets each of which is transmitted at the signal cycle corresponding to the unit time of the signal generated by the timer unit 201. The packet train generating unit 202 generates at least one adjustment packet the number of which corresponds to the measurement bandwidth, as the at least one adjustment packet that is inserted between two of the probe packets.

More specifically, the packet train generating unit 202 obtains, from the timer unit 201, the unit time that is the minimum interval allowing accurate control of the transmission of the packets. For example, in the case where the timer unit 201 operates at 250 Hz, the packet train generating unit 202 obtains 4 ms as the unit time.

Next, the packet train generating unit 202 generates a packet train composed of the probe packets and adjustment packets, using the obtained unit time and the measurement bandwidth.

For example, in the case where the unit time is 4 ms and the measurement bandwidth is 8 Mbps, the amount of information transmitted per unit time is 4000 bytes (=8 Mbps×4 ms). In other words, when the data size of a packet is 1000 bytes, the number of the packets per unit time is 4. For this reason, the packet train generating unit 202 generates the packet train by inserting three adjustment packets for a probe packet.

In other words, the packet train generating unit 202 generates the packet train by inserting adjustments packets between probe packets when the transmission interval between two probe packets is smaller than the unit time measurable by the timer unit 201 due to the high measurement bandwidth.

When the data size of a packet is 500 bytes, the number of the packets per unit time is 8. In this case, the packet train generating unit 202 generates the packet train by inserting seven adjustment packets for a probe packet.

Next, the transmitting unit 203 of the transmitting terminal 11 assigns transmission time information to each of the packets in the packet train at the time of the transmission, and then transmits the packets in the packet train to the receiving terminal 12 (S106). Here, the transmission time information may be the raw transmission time at which each of the packets is transmitted by the transmitting unit 203, or may be information such as symbols or numerals for identifying the transmission times. Here, it is only necessary for the transmitting unit 203 to assign the transmission time information to at least each of the probe packets when transmitting the packet train, thus there is no need to assign the transmission time information to each of the adjustment packets.

Here, a description is given of the packet train transmitted by the transmitting unit 203.

Figure 6:
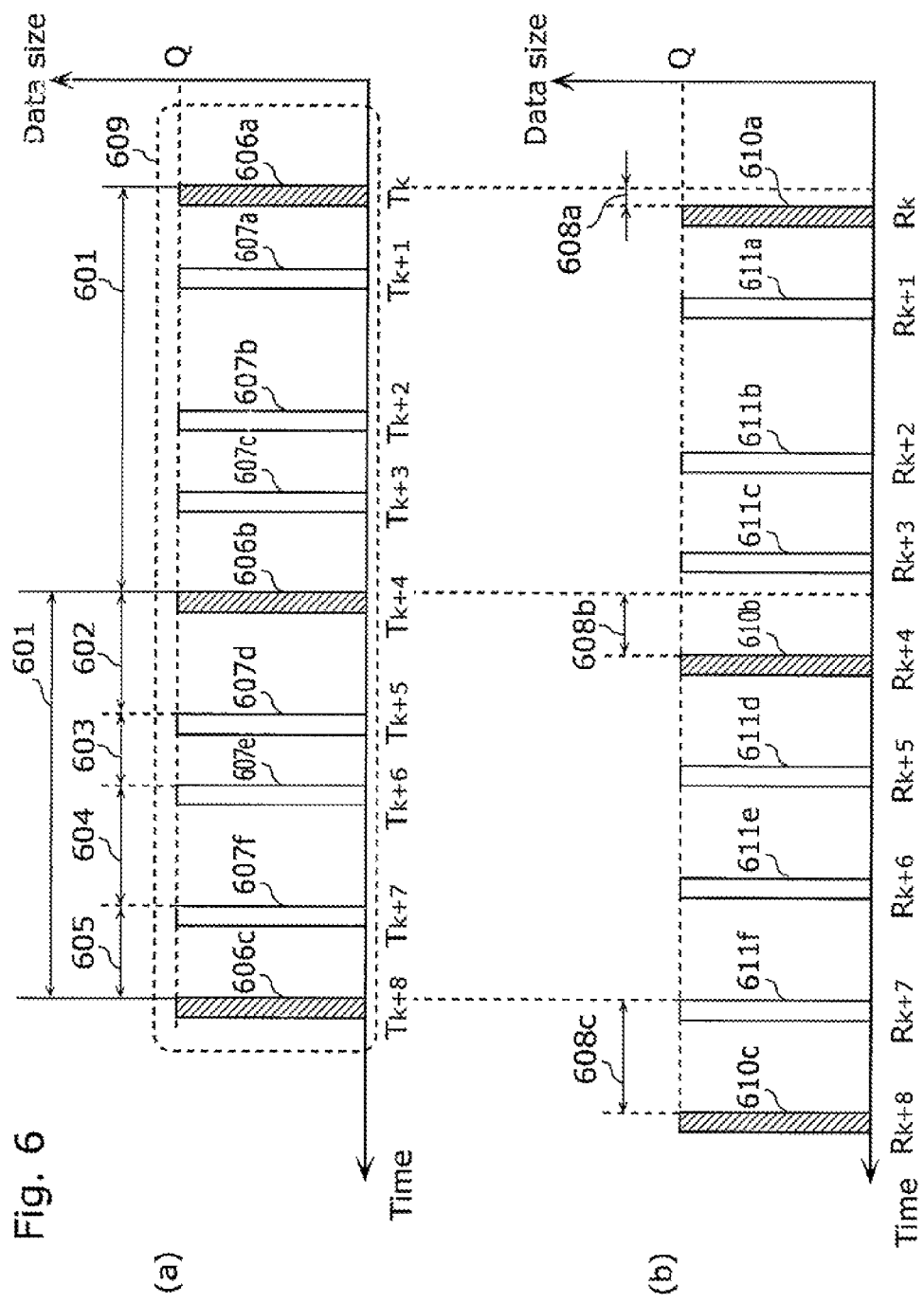
FIG. 6 is a diagram illustrating a packet train in Embodiment 1.

FIG. 6 is a diagram illustrating a packet train in Embodiment 1. More specifically, (a) in FIG. 6 shows the timings at which the packets are transmitted by the transmitting terminal 11. On the other hand, (b) in FIG. 6 shows the timings at which the packets are received by the receiving terminal 12.

As shown in (a) in the diagram, a unit time 601 is a signal interval between signals generated by the timer unit 201, and each of transmission intervals 602, 603, 604, and 605 denotes a transmission interval of a packet to be transmitted in the unit time. Probe packets 606a to 606c and adjustment packets 607a to 607f are the packets that constitute a packet train 609.

In other words, the transmission interval between two probe packets is the unit time 601. The transmitting unit 203 transmits the adjustment packets inserted between the probe packets without strictly controlling the transmission time of each of the adjustment packets (it is preferable that the adjustment packets should be transmitted at equal intervals, but increased or decreased transmission intervals are allowable).

More specifically, the transmission interval between the probe packet 606a and the probe packet 606b and the transmission interval between the probe packet 606b and the probe packet 606c are fixed at the unit time 601. On the other hand, the transmission intervals between the adjustment packets 607a to 607f may be variable. In other words, it is only necessary that the sum of the transmission intervals 602, 603, 604, and 605 of the adjustment packets corresponding to Time $T_{k+4}$ to Time $T_{k+8}$ is equal to the unit time 601. This is true of the transmission intervals of the adjustment packets corresponding to Time $T_k$ to Time $T_{k+4}$.

For example, when the unit time is 4 ms, the transmission intervals (the interval between $T_k$ and $T_{k+8}$, and the interval between $T_{k+B}$ and $T_{k+a}$) between the probe packets are fixed at 4 ms. On the other hand, it is not always necessary that the transmission intervals 602, 603, 604, and 605 of the adjustment packets are exactly 1 ms, and it is only necessary that the total of these intervals is 4 ms. For example, the intervals may be 1.2 ms, 0.6 ms, 1.3 ms, and 0.9 ms, or may be any other combination of intervals that amount to 4 ms.

In this way, the transmitting unit 203 transmits each of the probe packets to the receiving terminal 12 at the signal cycle corresponding to the unit time, and transmits the adjustment packets between when one of the two probe packets is transmitted and when the other one is transmitted.

It is to be noted that the transmitting unit 203 may not transmit any adjustment packet following the last probe packet in the packet train, and thus the adjustment packet is not shown in FIG. 6.

Next, as shown in FIG. 4 and FIG. 5, the reception time measuring unit 204 of the receiving terminal 12 receives each of the packets in the packet train 609 transmitted from the transmitting terminal 11, and measures and records the reception time (S202). More specifically, as shown in (b) in FIG. 6, the reception time measuring unit 204 receives the probe packets 606a to 610c and adjustment packets 611a to 611f; and measures and records the reception time $R_k$ to $R_{k+8}$.

The packet extracting unit 205 of the receiving terminal 12 extracts the probe packets from among the plural packets included in the packet train (S204). More specifically, the packet extracting unit 205 judges whether or not each of the received packets is a probe packet, and extracts the probe packets 610a to 610c as shown in (b) in FIG. 6.

For example, the packet extracting unit 205 extracts the probe packets each of which has been transmitted at the signal cycle corresponding to the unit time with reference to the transmission time of each of the packets. Alternatively, in the case where each of the transmitted packets has identification information identifying a probe packet, the packet extracting unit 205 extracts each of the packets as the probe packet, using the identification information. If the packets received at this time are any of adjustments packets 611a to 611f; these packets may be discarded.

Alternatively, the process (S204) performed by the packet extracting unit 205 to extract the probe packets may be performed before the process (S202) performed by the reception time measuring unit 204 to measure the reception times of the packets. In this case, the packet extracting unit 205 receives a packet train from the transmitting terminal 11 and extracts the probe packets, whereas the reception time measuring unit 204 measures the reception times of the probe packets extracted by the packet extracting unit 205.

Next, the transmitting unit 206 of the receiving terminal 12 transmits the return information to the transmitting terminal 11 (S206). More specifically, as shown in (b) in FIG. 6, the transmitting unit 206 transmits one way delays 608a to 608c as the return information to the transmitting terminal 11. Here, each of the one way delays 608a to 608c is obtainable based on the transmission time included in each of the probe packets 610a to 610c and the reception time of the same received by the receiving terminal 12. It is to be noted that the return information may be information indicating the reception time of each of the probe packets 610a to 610c, instead of the one way delays 608a to 608c.

Next, as shown in FIG. 3 and FIG. 5, the receiving unit 207 of the transmitting terminal 11 receives the return information from the transmitting unit 206 of the receiving terminal 12 (S108). More specifically, the receiving unit 207 receives, from the receiving terminal 12, the return information including the one way delay of each of the probe packets in the transmitted packet train. Here, in the case where the return information is the information indicating the reception time of each of the probe packets, either the receiving unit 207 or the judging unit 209 calculates the one way delay.

The judging unit 209 judges whether or not the current measurement bandwidth is an available bandwidth, based on the return information (S110). More specifically, the judging unit 209 judges the availability of the measurement bandwidth by calculating a tendency of increase in the one way delays of the respective probe packets, according to Expression 1, for example.

Expression 1

$$PCT = \frac{\sum_{k=2}^{M} I(D_k > D_{k-1})}{M - 1} \quad \text{[Math. 1]}$$

Expression 1 shows a PCT (Pairwise Comparison Test) value that is an indicator of the percentage of packets having an increased one way delay in a single packet train. In Expression 1, D denotes a one way delay ($D_k$ denotes the k-th one way delay), and M denotes the length of the packet train (the number of elements, or the number of the probe packets). I(exp) is a function that is 1 when exp is satisfied, and otherwise it is 0. In other words, the PCT takes a value ranging from 0 to 1. A PCT value closer to 1 shows a larger tendency of increase in the one way delay.

The judging unit 209 calculates a PCT value according to Expression 1, and when the calculated PCT value is smaller than a predetermined value (for example, 0.5), judges that the current measurement bandwidth is an available bandwidth. Alternatively, the judging unit 209 may judge the availability of the measurement bandwidth according to Expression 2, instead of Expression 1

Expression 2

$$PDT = \frac{D_M - D_1}{\sum_{k=2}^{M} |D_k - D_{k-1}|} \quad \text{[Math. 2]}$$

Expression 2 shows a PDT (Pairwise Difference Test) value that is an indicator of whether there is an increase in the one way delay between the start and the end of the packet train. In Expression 2, D denotes a one way delay ($D_k$ denotes the k-th one way delay), and M denotes the length of the packet train (the number of elements, or the number of the probe packets). Here, the PCT takes a value ranging from $-1$ to $+1$. A PCT value closer to 1 shows a larger tendency of increase in the one way delay.

The judging unit 209 calculates a PDT value according to Expression 2, and when the calculated PDT value falls within a predetermined range (for example, in a range from $-0.5$ to $0.5$), judges that the current measurement bandwidth is an available bandwidth. Alternatively, the judging unit 209 may judge the availability of the measurement bandwidth according to both Expression 1 and Expression 2.

Next, the determining unit 208 determines the available bandwidth based on the result of the judgment by the judging unit 209 (S112). In other words, the determining unit 208 determines that the measurement bandwidth found to be available by the judgment by the judging unit 209 is an available bandwidth.

The transmitting terminal 11 can judge the availability of the bandwidth desired to be finally measured, by operating as described above in Embodiment 1. As a result, it is possible to accurately estimate the availability of a wider bandwidth, irrespective of the unit time based on which each of the packets can be controlled.

More specifically, the transmitting terminal 11 in Embodiment 1 generates probe packets each including transmission time information and adjustment packets, transmits each of the probe packets at an interval corresponding to the unit time, transmits the adjustment packets between when one of the two probe packets is transmitted and when the other one is transmitted, receives return information obtainable based on the reception time of each of the probe packets received by the receiving terminal 12, and determines the available bandwidth using the return information. In other words, a greater number of packets must be transmitted in a higher measurement bandwidth, and thus many packets are inserted and transmitted between the probe packets. Probe packets each of which is transmitted at the timer signal cycle are used to determine the available bandwidth. In this way, it is possible to accurately measure the available bandwidth in a network by performing the measurement using a packet train with consideration of the timer signal cycle (the minimum controllable transmission interval). In other words, even a weak CPU for use in an embedded device accurately transmits the probe packets at the minimum controllable transmission interval. In this way, it is possible to measure a delay time more accurately, which makes it possible to measure the available bandwidth more accurately. Furthermore, even the weak CPU for use in the embedded device transmits the adjustment packet not for use in the measurement of the delay time and thus no accurate control of the transmission time is performed therefor. In this way, it is possible to accurately estimate the available bandwidth even in the high bandwidth in the network.

In addition, whether or not the measurement bandwidth is an available bandwidth is judged using the received return information including either the information indicating the reception time of each of the probe packets or the information indicating the delay time, and the available bandwidth is determined based on the result of the judgment. In other words, the transmitting terminal 11 makes the judgment on the available bandwidth based on the return information, and thereby the transmitting terminal 11 can judge the availability of the bandwidth desired to be finally measured. As a result, it is possible to estimate the available bandwidth in the high bandwidth more accurately, irrespective of the unit time based on which each of the packets can be controlled.

In addition, the transmitting terminal 11 determines the number of the probe packets and the number of the adjustment packets, based on the unit time and the measurement bandwidth, and generates the determined numbers of the probe packets and the adjustment packets. In other words, since the number of the probe packets and the number of the adjustment packet vary depending on the unit time and the measurement bandwidth, the numbers are determined first, and then the determined numbers of the probe packets and the adjustment packets are generated. In this way, even in the high measurement bandwidth, it is possible to accurately estimate the available bandwidth in the network by adjusting the numbers of the probe packets and the adjustment packets.

Furthermore, the receiving terminal 12 in Embodiment 1 measures the reception time of each of the probe packets each of which is transmitted at the signal cycle corresponding to the unit time and includes transmission time information, extracts the probe packets, and returns, to the transmitting terminal 11, the return information obtainable based on the reception time of each of the probe packets. In other words, the number of the plural packets received from the transmitting terminal 11 corresponds to the measurement bandwidth, and thus the receiving terminal 12 extracts the probe packets each transmitted at the timer signal cycle, and returns, to the transmitting terminal 11, the return information regarding the probe packets. In this way, the transmitting terminal can determine the available bandwidth using the return information. In this way, it is possible to accurately measure the available bandwidth in the network by performing the measurement using the packet train with consideration of the timer signal cycle (the minimum controllable transmission interval). In other words, even in the high bandwidth, the transmitting apparatus can accurately estimate the available bandwidth in the network by returning, to the transmitting terminal 11, the information indicating the reception time of each of the probe packets.

Embodiment 2

Embodiment 2 describes repeatedly performing the sequential processes in Embodiment 1 shown as processes for determining an available bandwidth based on the result of a judgment on the availability of a bandwidth desired to be measured, and thereby searching out an available bandwidth.

Figure 7:
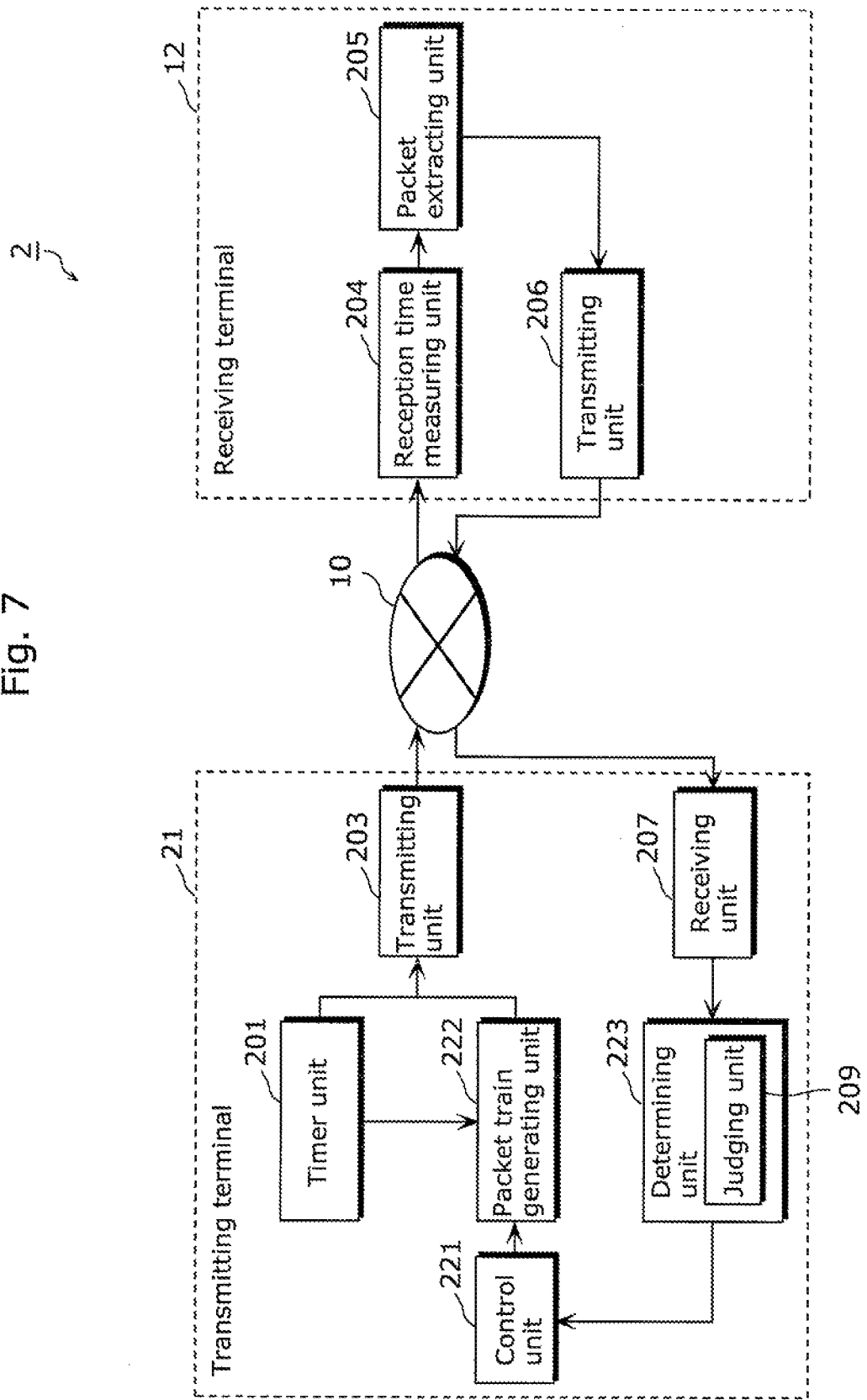
FIG. 7 is a diagram showing a structure of a transmitting and receiving system in Embodiment 2.

FIG. 7 is a diagram showing a structure of a transmitting and receiving system 2 in Embodiment 2 of the present invention.

As shown in the diagram, the transmitting and receiving system 2 includes a transmitting terminal 21 and a receiving terminal 12 connected via a communication network 10.

The transmitting terminal 21 includes a timer unit 201, a packet train generating unit 222, a transmitting unit 203, a receiving unit 207, a determining unit 223, and a control unit 221. The determining unit 223 includes a judging unit 209. On the other hand, the receiving terminal 12 includes a reception time measuring unit 204, a packet extracting unit 205, and a transmitting unit 206.

Here, in the diagram, the communication network 10, the timer unit 201, the transmitting unit 203, the receiving unit 207, the reception time measuring unit 204, the packet extracting unit 205, the transmitting unit 206, and the judging unit 209 are the same as the communication network 10, the timer unit 201, the transmitting unit 203, the receiving unit 207, the reception time measuring unit 204, the packet extracting unit 205, the transmitting unit 206, and the judging unit 209 in Embodiment 1 as shown in FIG. 1 and FIG. 2, respectively. Thus, the same detailed descriptions thereof are not repeated here.

The determining unit 223 transmits, each time the receiving unit 207 determines the available bandwidth using return information, the result of the determination to the control unit 221.

The control unit 221 determines, each time the determining unit 223 determines the available bandwidth, a next measurement bandwidth to be measured, based on the result of the determination of the available bandwidth. More specifically, the control unit 221 determines an initial measurement bandwidth in a range (specified by the upper limit and the lower limit) of a bandwidth to be measured. Next, the control unit 221 determines each of the second and the following measurement bandwidths, based on the result obtained when the determining unit 223 determines the a next available bandwidth based on the result obtained when the measurement bandwidth judges the availability of a current measurement bandwidth.

The packet train generating unit 222 determines the number of the probe packets and the number of the adjustment packets, each time the control unit 221 determines a current measurement bandwidth, and generates the determined numbers of the probe packets and the adjustment packets.

Next, descriptions are given of processes performed by the transmitting and receiving system 2 in Embodiment 2 to estimate an available bandwidth.

Figure 8:
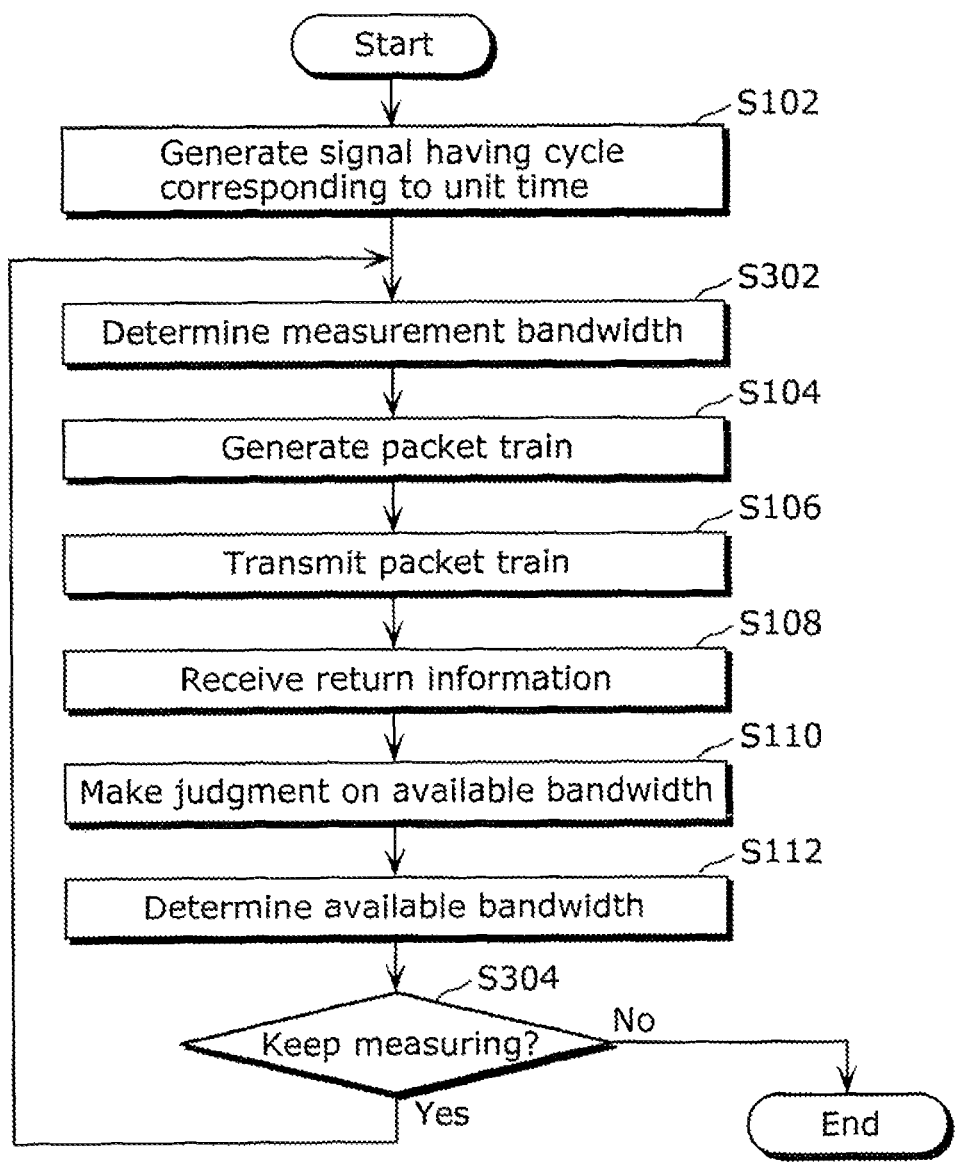
FIG. 8 is a flowchart of exemplary processes performed by the transmitting terminal in Embodiment 2.

FIG. 8 is a flowchart of exemplary processes performed by the transmitting terminal 21 in Embodiment 2. The processes performed by the transmitting terminal 21 are described with reference to the same diagram.

It is to be noted that the processes of S102, and S104 to S112 in the diagram are the same as the processes of S102, S104 to S112 as shown in FIG. 3 in Embodiment 1, and thus the same detailed descriptions thereof are not repeated here. In addition, the flow of processes performed by the receiving terminal 12 is the same as in FIG. 4 showing the flow of processes performed by the receiving terminal 12 in Embodiment 1, and thus the same detailed descriptions thereof are not repeated here.

As shown in the diagram, first, the timer unit 201 generates a signal having a signal cycle corresponding to a unit time that is the minimum interval allowing accurate control of transmission of a packet (S102).

Next, the control unit 221 determines a measurement bandwidth in a specified range of a bandwidth to be measured (S302). For example, it is assumed that the measurement bandwidth ranges from 2 Mbps (the lower limit) to 10 Mbps (the upper limit). In this case, the control unit 221 determines an initial measurement bandwidth to be 2 Mbps.

Next, the packet train generating unit 222 generates a packet train including plural probe packets and if necessary further including at least one adjustment packet, according to the measurement bandwidth determined based on the unit time that is the interval of a signal generated by the timer unit 201 and the measurement bandwidth determined by the control unit 221.

Next, the transmitting unit 203 assigns transmission time information to each of the packets in the packet train generated by the packet train generating unit 222 at the time of the transmission, and transmits each of the packets in the packet train to the receiving terminal 12 (S106).

The receiving terminal 12 receives the packet train transmitted from the transmitting terminal 21, and transmits the return information to the transmitting terminal 21.

The receiving unit 207 receives the return information transmitted from the receiving terminal 12 (S108), and the judging unit 209 determines whether or not the measurement bandwidth is available (S110).

The determining unit 223 determines the available bandwidth based on the result of the judgment by the judging unit 209 (S112), and notifies the determination result to the control unit 221.

The control unit 221 decides whether or not to continue the measurement, based on the result of determining the available bandwidth by the determining unit 223 (S304).

More specifically, in the case where the measurement bandwidth of 2 Mbps is determined to be an unavailable bandwidth, the control unit 221 decides to finish the measurement, assuming that the bandwidth higher than 2 Mbps is not available. When the control unit 221 decides to finish the measurement (No in S304), the processing is terminated.

In the opposite case where the measurement bandwidth of 2 Mbps is determined to be an available bandwidth, the control unit 221 decides to continue the measurement, assuming that there may be an available bandwidth in the range up to 10 Mbps that is the upper limit.

When the control unit 221 decides to continue the measurement based on the result of determining the available bandwidth by the determining unit 223 (Yes in S304), the control unit 221 determines a next measurement bandwidth (S302). In other words, when the result of determining the availability of the measurement bandwidth is "available", the control unit 221 determines a higher measurement bandwidth as a next measurement bandwidth. As a specific example, when the result of determining the availability of the measurement bandwidth of 2 Mbps is "available", the control unit 221 determines a next measurement bandwidth of 4 Mbps.

In the example described here, the control unit 221 searches out the available bandwidth at the upper limit by performing control such that a measurement bandwidth having a small initial value is measured first, and a higher bandwidth is measured next based on the result of determining an available bandwidth. Alternatively, the control unit 221 may perform control such that a measurement bandwidth having a large initial value is measured first, and a lower bandwidth is measured next based on the result of determining an available bandwidth. Alternatively, the control unit 221 may search out the upper value for the available bandwidth by performing binary search or another method.

In the case where the availability of a measurement bandwidth cannot be clearly judged, it is also possible to re-measure the same bandwidth.

In the above-described example, whether or not the upper limit for the available bandwidth is found is judged each time the availability of a current measurement bandwidth is judged, before the termination of the processing. However, the upper limit for the available bandwidth may be judged by judging the availability of each of plural predetermined measurement bandwidths. For example, measurements may be performed four times at 2 Mbps, 4 Mbps, 8 Mbps, and 10 Mbps.

The transmitting terminal 21 can know the maximum value (available bandwidth) for the bandwidth found to be available by the final judgment by operating as described in Embodiment 2. As a result, it is possible to estimate the available bandwidth in the network, irrespective of the unit time based on which each of the packets can be controlled.

In this way, the transmitting terminal 21 according to Embodiment 2 repeatedly determines an available bandwidth by shifting to a next target measurement bandwidth to be measured such that a new target measurement bandwidth is repeatedly determined each time an available bandwidth is determined. In this way, it is possible to search out the available bandwidth in a predetermined measurement bandwidth range.

Embodiment 3

In the examples in Embodiments 1 and 2, the transmitting terminals 11 or 21 judges the availability of a measurement bandwidth. However, in Embodiment 3, a receiving terminal judges the availability of a measurement bandwidth, and returns the judgment result to a transmitting terminal.

Figure 9:
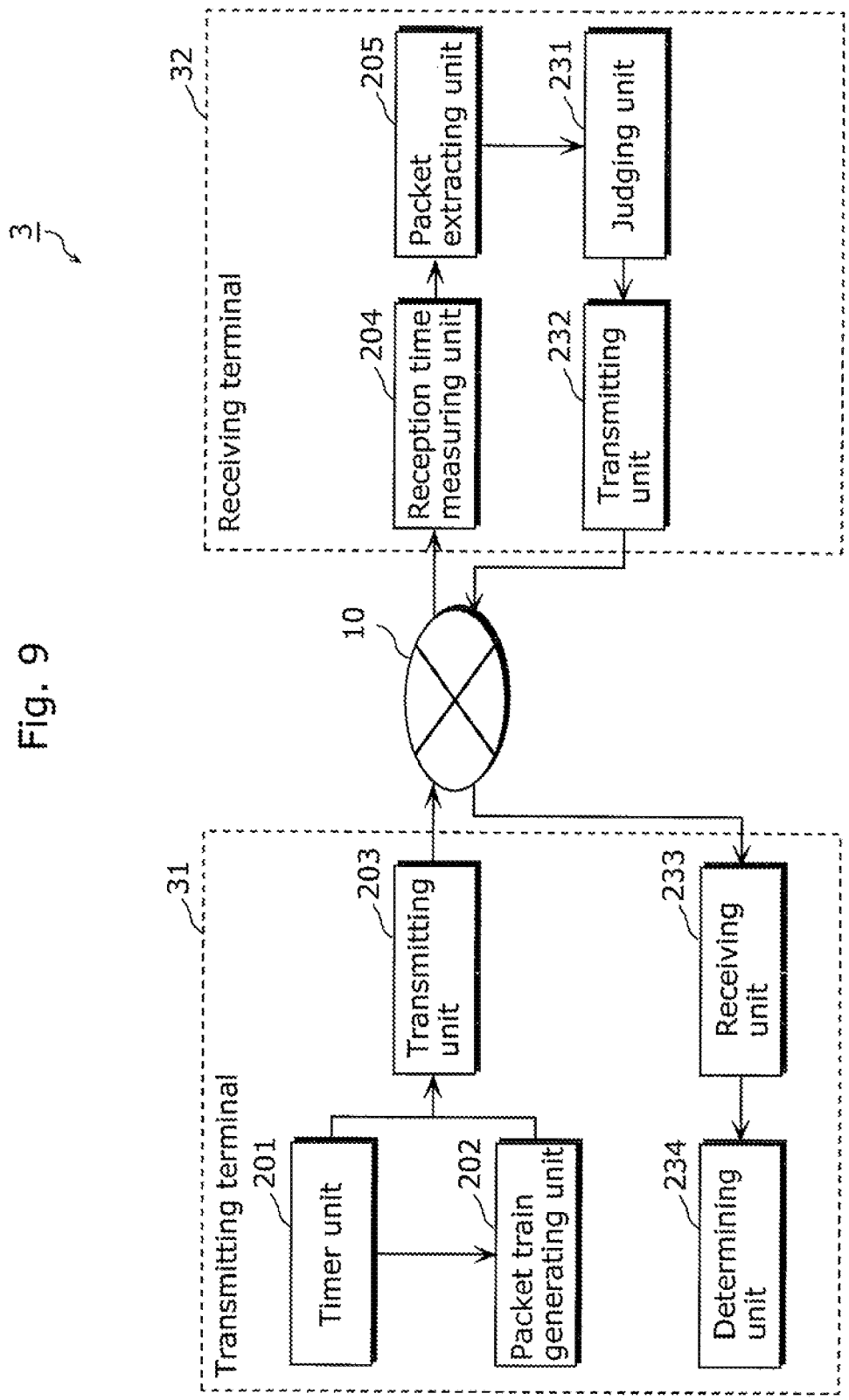
FIG. 9 is a diagram showing a structure of a transmitting and receiving system in Embodiment 3.

FIG. 9 is a diagram showing a structure of a transmitting and receiving system 3 in Embodiment 3 of the present invention.

As shown in the diagram, the transmitting and receiving system 3 includes a transmitting terminal 31 and a receiving terminal 32 connected via a communication network 10.

The transmitting terminal 31 includes a timer unit 201, a packet train generating unit 202, a transmitting unit 203, a receiving unit 233, and a determining unit 234. On the other hand, the receiving terminal 32 includes a reception time measuring unit 204, a packet extracting unit 205, a judging unit 231, and a transmitting unit 232.

Here, in the diagram, the communication network 10, the timer unit 201, the packet train generating unit 202, the transmitting unit 203, the reception time measuring unit 204, and the packet extracting unit 205 are the same as the communication network 10, the timer unit 201, the packet train generating unit 202, the transmitting unit 203, the reception time measuring unit 204, and the packet extracting unit 205 in Embodiment 1 as shown in FIG. 1 and FIG. 2, respectively. Thus, the same detailed descriptions thereof are not repeated here.

The judging unit 231 of the receiving terminal 32 judges whether or not a target measurement bandwidth to be measured is an available bandwidth, based on a delay time that is the difference between the transmission time and the reception time of a probe packet extracted by the packet extracting unit 205.

The transmitting unit 232 of the receiving terminal 32 returns, to the transmitting terminal 31, return information including the result of the judgment by the judging unit 231.

The receiving unit 233 of the transmitting terminal 31 receives, from the receiving terminal 32, the return information including the result of the judgment that is on whether or not the measurement bandwidth is an available bandwidth and using the reception time of each of the probe packets.

The determining unit 234 of the transmitting terminal 31 determines the available bandwidth based on the judgment result included in the return information received by the receiving unit 233.

Next, descriptions are given of processes performed by the transmitting and receiving system 3 in Embodiment 3 to estimate an available bandwidth.

Figure 10:
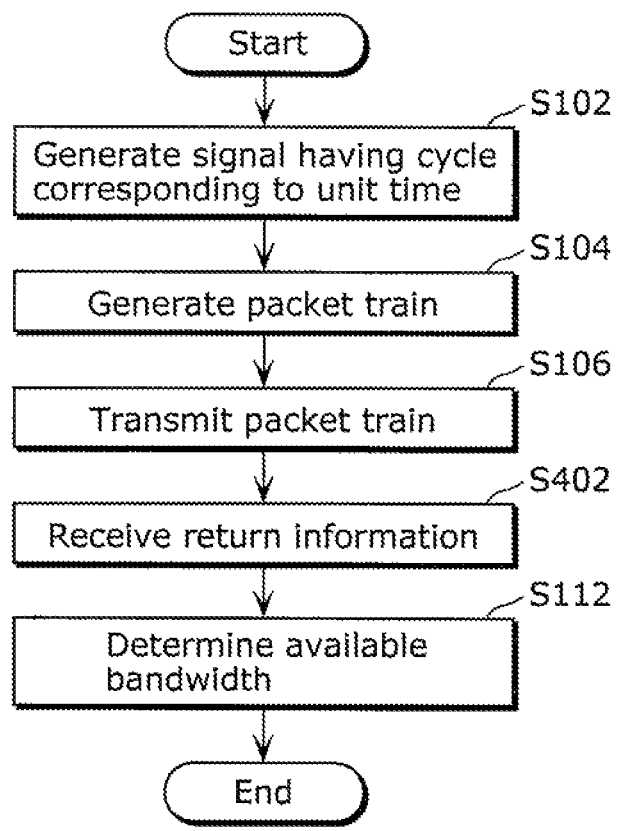
FIG. 10 is a flowchart of exemplary processes performed by the transmitting terminal in Embodiment 3.

FIG. 10 is a flowchart of exemplary processes performed by the transmitting terminal 31 in Embodiment 3. The processes performed by the transmitting terminal 31 are described with reference to the same diagram.

Figure 11:
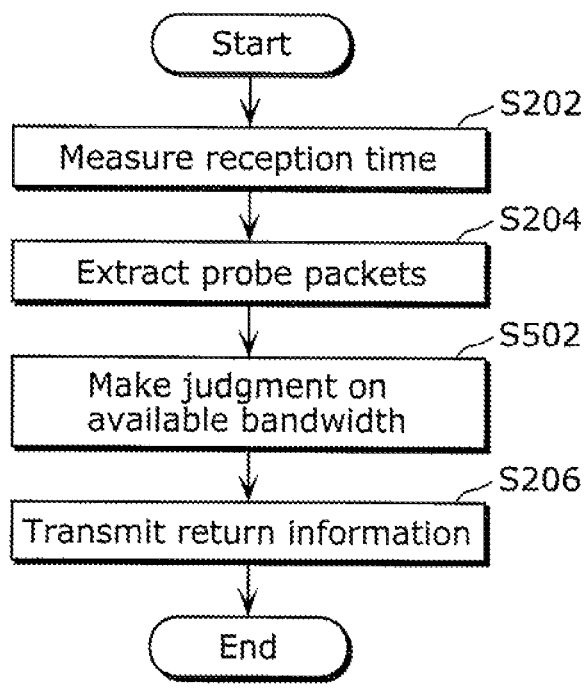
FIG. 11 is a flowchart of exemplary processes performed by the receiving terminal in Embodiment 3.

FIG. 11 is a flowchart of exemplary processes performed by the receiving terminal 32 in Embodiment 3. The processes performed by the receiving terminal 32 are described with reference to the same diagram.

It is to be noted that, in FIG. 10, the processes of S102 to S106, and S112 are the same as the processes of S102 to S106, and S112 as shown in FIG. 3 in Embodiment 1, and thus the same detailed descriptions are not repeated here. Likewise, in FIG. 11, the processes of S202 to S204, and S206 are the same as the processes of S202 to S204, and S206 as shown in FIG. 4 in Embodiment 1, and thus the same detailed descriptions are not repeated here.

First, as shown in FIG. 10, the transmitting terminal 31 generates a packet train based on the unit time obtained from the timer unit 201 and the measurement bandwidth, and transmits each of the packets in the packet train to the receiving terminal 32 (S102 to S106).

Next, as shown in FIG. 11, the receiving terminal 32 receives the packet train transmitted by the transmitting terminal 31, and extracts the probe packet (S202 to S204).

Next, the judging unit 231 of the receiving terminal 32 judges whether or not the measurement bandwidth is an available bandwidth, based on the delay time that is the difference between the transmission time and the reception time of the extracted packet (S502).

More specifically, as shown in (b) in FIG. 6, the judging unit 231 calculates one way delays 608*a* to 608*c* obtainable from the difference between the transmission time and the reception time included in each of the extracted probe packets 610*a* to 610*c*. Next, the judging unit 231 judges the availability of the measurement bandwidth, based on the calculated one way delays 608*a* to 608*c*. It is to be noted that the specific judgment procedure taken by the judging unit 231 may be the same as the judgment procedure taken by the judging unit 209 in Embodiment 1.

Next, the transmitting unit 232 of the receiving terminal 32 assigns the result of the availability judgment by the judging unit 231 to the transmitting terminal 31 (S206).

Returning to FIG. 10, the receiving unit 233 of the transmitting terminal 31 receives the return information including the judgment result from the receiving terminal 32 (S402).

Next, the determining unit 234 of the transmitting terminal 31 determines the available bandwidth based on the result of the judgment by the receiving unit 233 (S112).

The receiving terminal 32 judges whether or not the measurement bandwidth is an available bandwidth based on the delay time of the probe packet by operating as described in Embodiment 3, and returns the return information including the judgment result to the transmitting terminal 31. In this way, the transmitting terminal 31 receives, from the receiving terminal 32, the return information including the judgment result obtained by judging whether or not the measurement bandwidth is the available bandwidth, and determines the available bandwidth based on the judgment result included in the received return information. For this reason, the transmitting terminal 31 can determine the available bandwidth based on the return information, without making any judgment on the available bandwidth. In this way, the transmitting terminal 31 can know the result of the judgment on the availability of the measurement bandwidth to be finally measured. As a result, it is possible to accurately estimate the available bandwidth in the high bandwidth, irrespective of the unit time based on which each of the packets can be controlled.

Embodiment 4

Embodiment 4 describes repeatedly performing the sequential processes in Embodiment 3 shown as processes for determining an available bandwidth based on the result of a judgment on the availability of a bandwidth to be measured, and thereby searching out an available bandwidth. In other words, Embodiment 4 has a structure obtained by adding the control unit 221 in Embodiment 2 to the structure of Embodiment 3.

Figure 12:
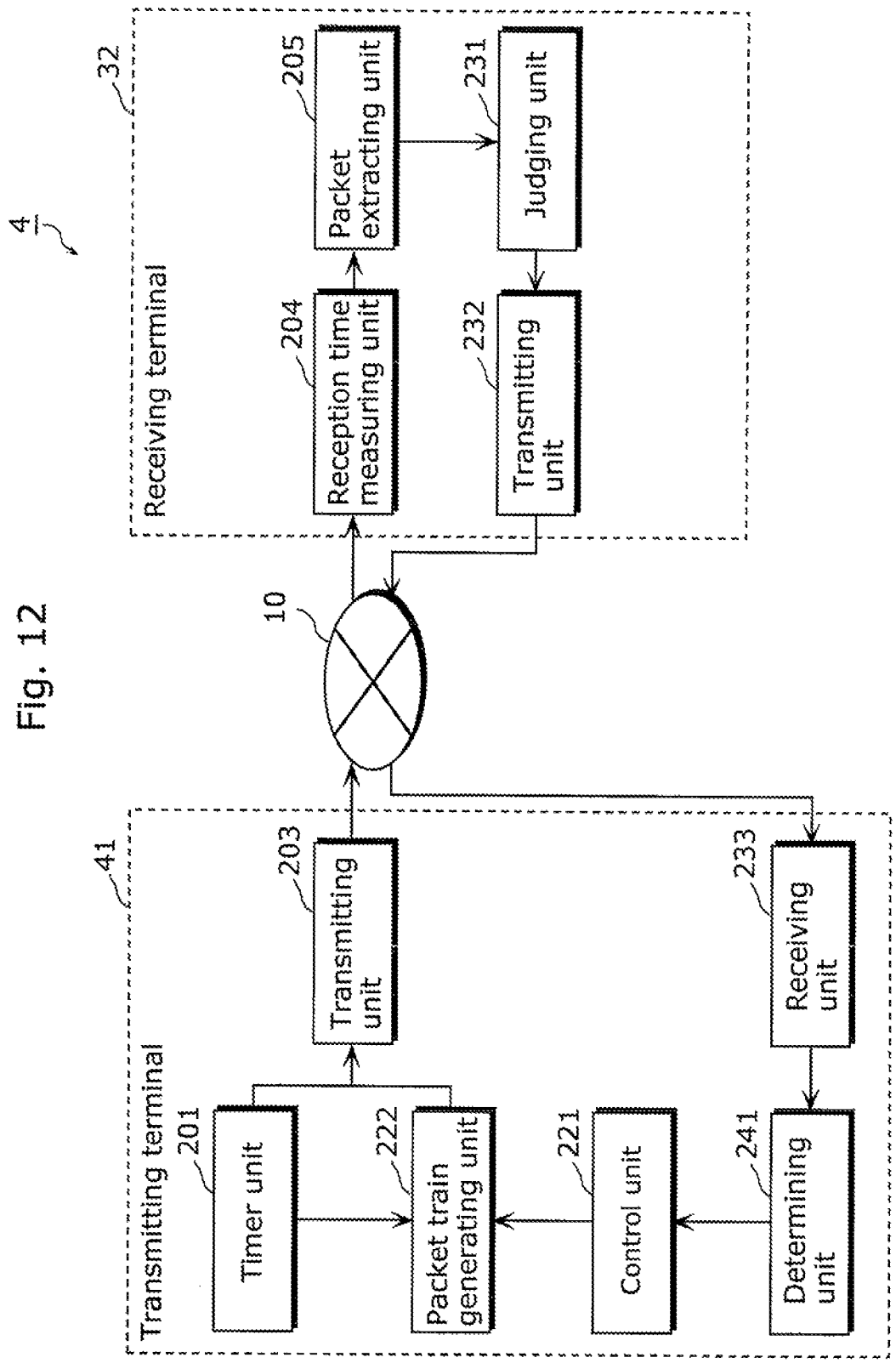
FIG. 12 is a diagram showing a structure of a transmitting and receiving system in Embodiment 4.

FIG. 12 is a diagram showing a structure of a transmitting and receiving system 4 in Embodiment 4 of the present invention.

As shown in the diagram, the transmitting and receiving system 4 includes a transmitting terminal 41 and a receiving terminal 32 connected via a communication network 10.

The transmitting terminal 41 includes a timer unit 201, a packet train generating unit 202, a transmitting unit 203, a receiving unit 233, a determining unit 241, and a control unit 221. On the other hand, the receiving terminal 32 includes a reception time measuring unit 204, a packet extracting unit 205, a judging unit 231, and a transmitting unit 232.

Here, in the diagram, the communication network 10, the timer unit 201, the packet train generating unit 222, the transmitting unit 203, the receiving unit 233, the control unit 221, the reception time measuring unit 204, the packet extracting unit 205, the transmitting unit 232, and the judging unit 231 are the same as the processing units having the same reference signs in Embodiment 2 as shown in FIG. 7 or Embodiment 3 as shown in FIG. 9. Thus, the same detailed descriptions thereof are not repeated here.

The determining unit 241 of the transmitting terminal 41 transmits, each time the receiving unit 233 determines an available bandwidth using return information, the result of the determination to the control unit 221. The control unit 221 determines, each time the determining unit 241 determines the available bandwidth, a next measurement bandwidth to be measured, based on the result of the determination of the available bandwidth.

Next, descriptions are given of processes performed by the transmitting and receiving system 4 in Embodiment 4 to estimate an available bandwidth.

Figure 13:
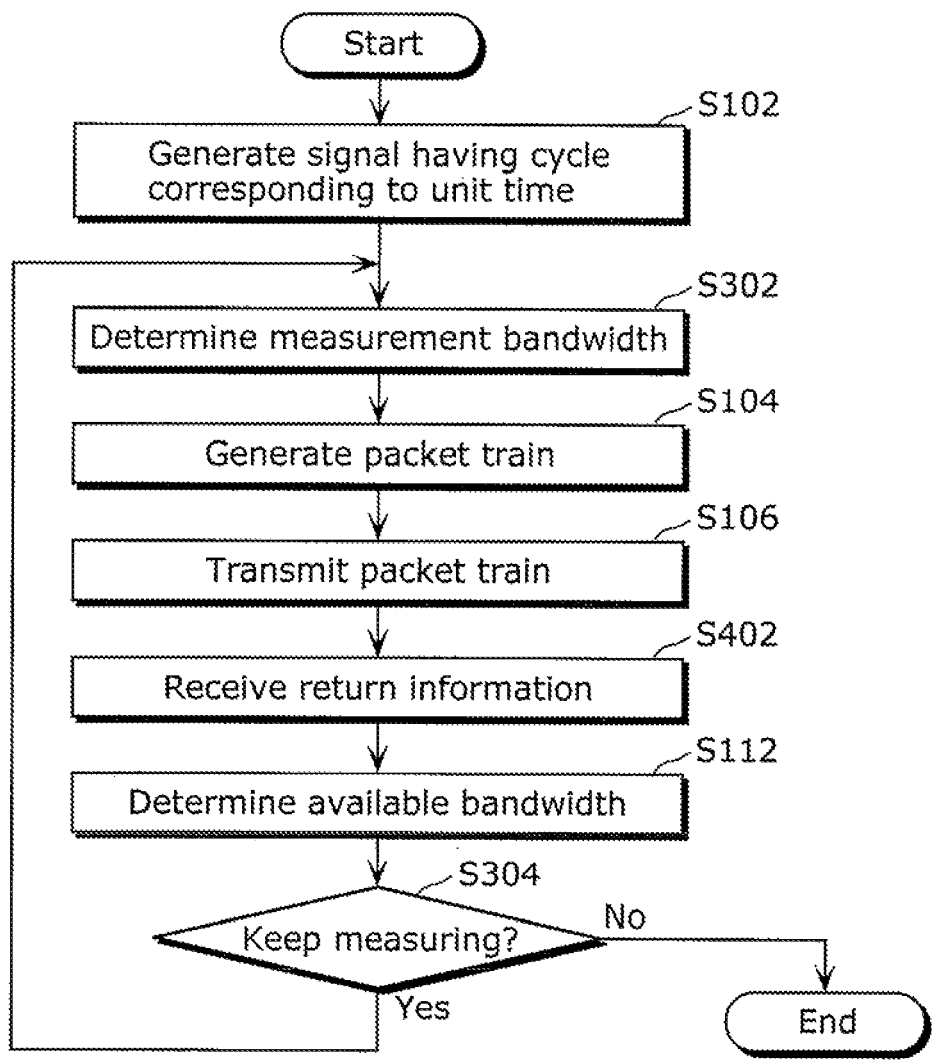
FIG. 13 is a flowchart of exemplary processes performed by the transmitting terminal in Embodiment 4.

FIG. 13 is a flowchart of exemplary processes performed by the transmitting terminal 41 in Embodiment 4. The processes performed by the transmitting terminal 41 are described with reference to the same diagram.

It is to be noted that the processes of S102, S104, S106, S402, and S112 in the diagram are the same as the processes of S102, S104, S106, S402, and S112 as shown in FIG. 10 in Embodiment 3, and thus the same detailed descriptions thereof are not repeated here. It is to be noted that the processes of S302 and S304 in the diagram are the same as the processes of S302 and S304 as shown in FIG. 8 in Embodiment 2, and thus the same detailed descriptions thereof are not repeated here. In addition, the flow of processes performed by the receiving terminal 32 is the same as in FIG. 11 showing the flow of processes performed by the receiving terminal 32 in Embodiment 3, and thus the same detailed descriptions thereof are not repeated here.

As shown in the diagram, first, the transmitting terminal 41 generates a packet train according to the unit time obtained from the timer unit 201 and the measurement bandwidth determined in a specified measurement bandwidth range, and transmits each of the packets in the packet train to the receiving terminal 32 (S102, S302, S104, S106).

Next, the receiving terminal 32 receives the packet train transmitted by the transmitting terminal 41, and makes a judgment on the availability of the measurement bandwidth. Next, the receiving unit 32 adds the judgment result to the return information, and transmits the return information to the transmitting terminal 41.

Next, the receiving unit 233 of the transmitting terminal 41 receives the return information including the judgment result from the receiving terminal 32 (S402).

Next, the determining unit 241 determines the available bandwidth using the return information (S112), and transmits the determination result to the control unit 221. Next, the control unit 221 decides whether or not to finish the processing or perform a next measurement, based on the determination result (S304).

The transmitting terminal 41 can know the maximum value (available bandwidth) for the bandwidth found to be available by the final judgment by operating as described in Embodiment 4. As a result, it is possible to estimate the available bandwidth in the network, irrespective of the unit time based on which each of the packets can be controlled.

With the transmitting terminal 41 according to Embodiment 4, the receiving terminal 32 judges whether or not the measurement bandwidth is an available bandwidth based on the delay time of the probe packet by operating as described in Embodiment 3, and returns the return information including the judgment result to the transmitting terminal 41. In this way, the transmitting terminal 41 receives, from the receiving terminal 32, the return information including the judgment result, and determines the available bandwidth based on the judgment result included in the received return information. For this reason, the transmitting terminal 41 can determine the available bandwidth based on the return information, without making any judgment on the available bandwidth. In this way, the transmitting terminal 41 can know the result of the judgment on the availability of the measurement bandwidth to be finally measured. As a result, the transmitting terminal 41 can accurately estimate the available bandwidth in the high bandwidth, irrespective of the unit time based on which each of the packets can be controlled.

Furthermore, the transmitting terminal 41 can repeatedly determine an available bandwidth by shifting to a next target measurement bandwidth to be measured such that a new target measurement bandwidth is repeatedly determined each time an available bandwidth is determined. In this way, it is possible to search out the available bandwidth in the predetermined measurement bandwidth range.

Embodiment 5

In each of Embodiments 1 to 4, the availability of a bandwidth is judged by changing the number of the packets without changing the size of packets in a packet train. However, in Embodiment 5, the availability of a bandwidth is judged by changing the sizes of the packets without changing the number of the packets.

Figure 14:
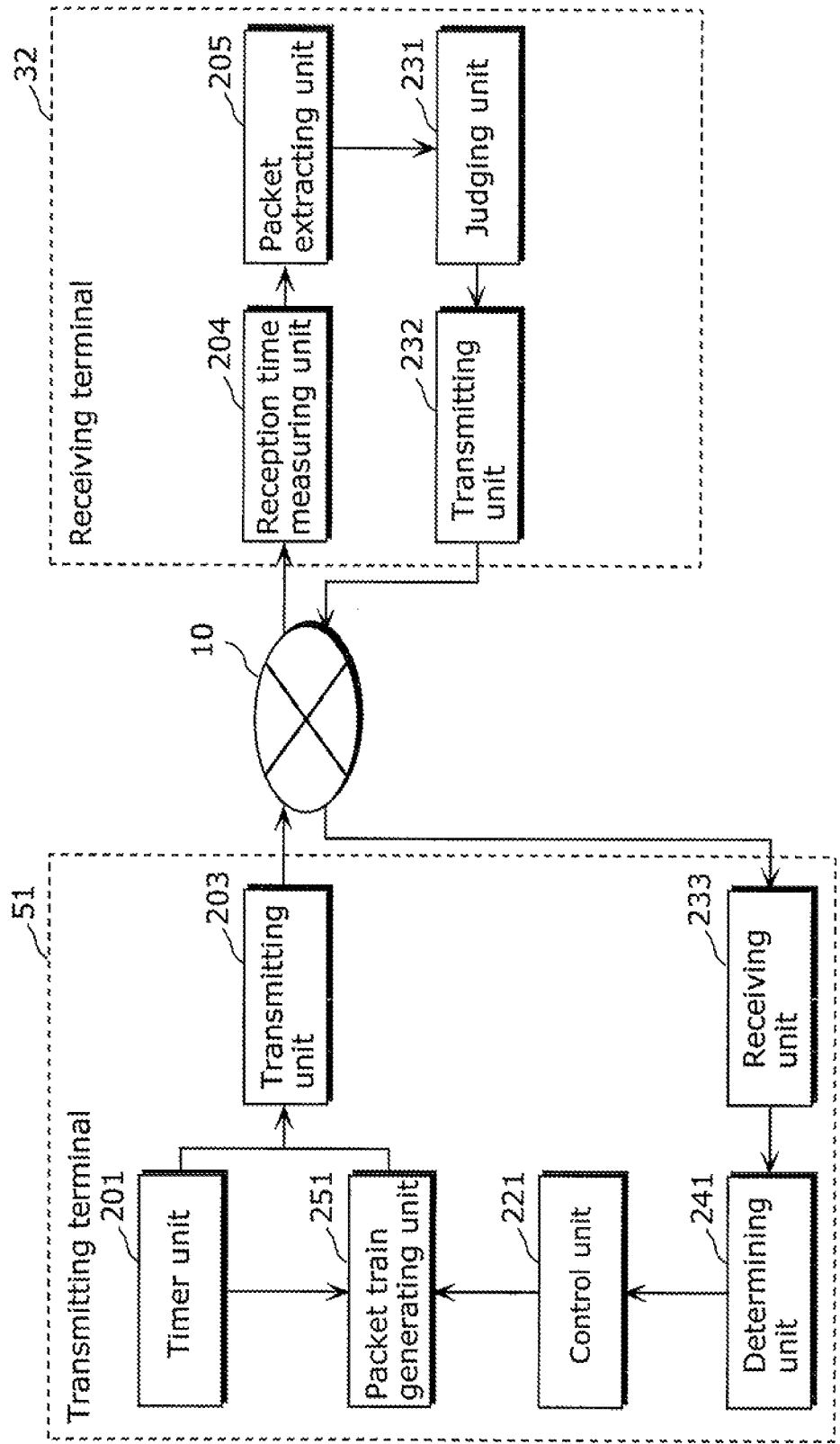
FIG. 14 is a diagram showing a structure of a transmitting and receiving system in Embodiment 5.

FIG. 14 is a diagram showing a structure of a transmitting and receiving system 5 in Embodiment 5 of the present invention.

As shown in the diagram, the transmitting and receiving system 5 includes a transmitting terminal 51 and a receiving terminal 32 connected via a communication network 10.

The transmitting terminal 51 includes a timer unit 201, a packet train generating unit 251, a transmitting unit 203, a receiving unit 233, a determining unit 241, and a control unit 221. On the other hand, the receiving terminal 32 includes a reception time measuring unit 204, a packet extracting unit 205, a judging unit 231, and a transmitting unit 232.

Here, in the diagram, the communication network 10, the timer unit 201, the transmitting unit 203, the receiving unit 233, the determining unit 241, the control unit 221, the reception time measuring unit 204, the packet extracting unit 205, the transmitting unit 232, and the judging unit 231 are the same as the processing units having the same reference signs in Embodiment 4 as shown in FIG. 12. Thus, the same detailed descriptions thereof are not repeated here.

The packet train generating unit 251 generates probe packets each of which is transmitted at the signal cycle corresponding to the unit time indicated by the signal generated by the timer unit 201 and have a data size according to the measurement bandwidth. More specifically, the packet train generating unit 251 generates the packet train including probe packets and if necessary further including at least one adjustment packet by fixing the unit time that is obtained from the timer unit 201 and changing the packet size according to the measurement bandwidth.

The transmitting unit 203 transmits, at the signal cycle corresponding to the unit time, each of the probe packets each including the transmission time information generated by the packet train generating unit 251 to the receiving terminal 32.

The receiving unit 233 receives, from the receiving terminal 32, the return information that is the information obtainable based on the reception time of each of the probe packets received by the receiving terminal 32.

The determining unit 241 determines the available bandwidth using the received return information.

Next, descriptions are given of processes performed by the transmitting and receiving system 5 in Embodiment 5 to estimate an available bandwidth.

Figure 15:
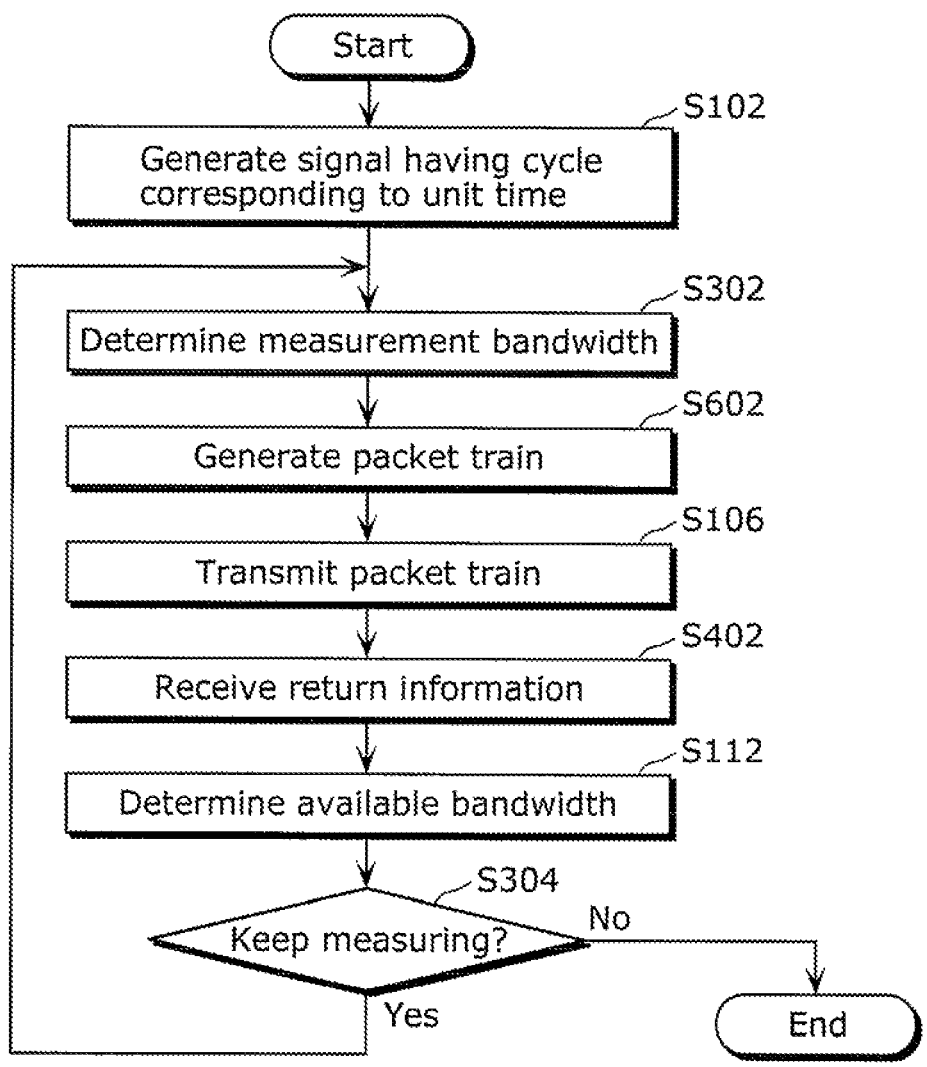
FIG. 15 is a flowchart of exemplary processes performed by the transmitting terminal in Embodiment 5.

FIG. 15 is a flowchart of exemplary processes performed by the transmitting terminal 51 in Embodiment 5. The processes performed by the transmitting terminal 51 are described with reference to the same diagram.

It is, to be noted that the processes of S102, S302, S106, S402, S112, and S304 in the diagram are the same as the processes of S102, S302, S106, S402, S112, and S304 as shown in FIG. 13 in Embodiment 4, and thus the same detailed descriptions thereof are not repeated here. In addition, the flow of processes performed by the receiving terminal 32 is the same as in FIG. 11 showing the flow of processes performed by the receiving terminal in Embodiment 3, and thus the same detailed descriptions thereof are not repeated here.

Figure 16:
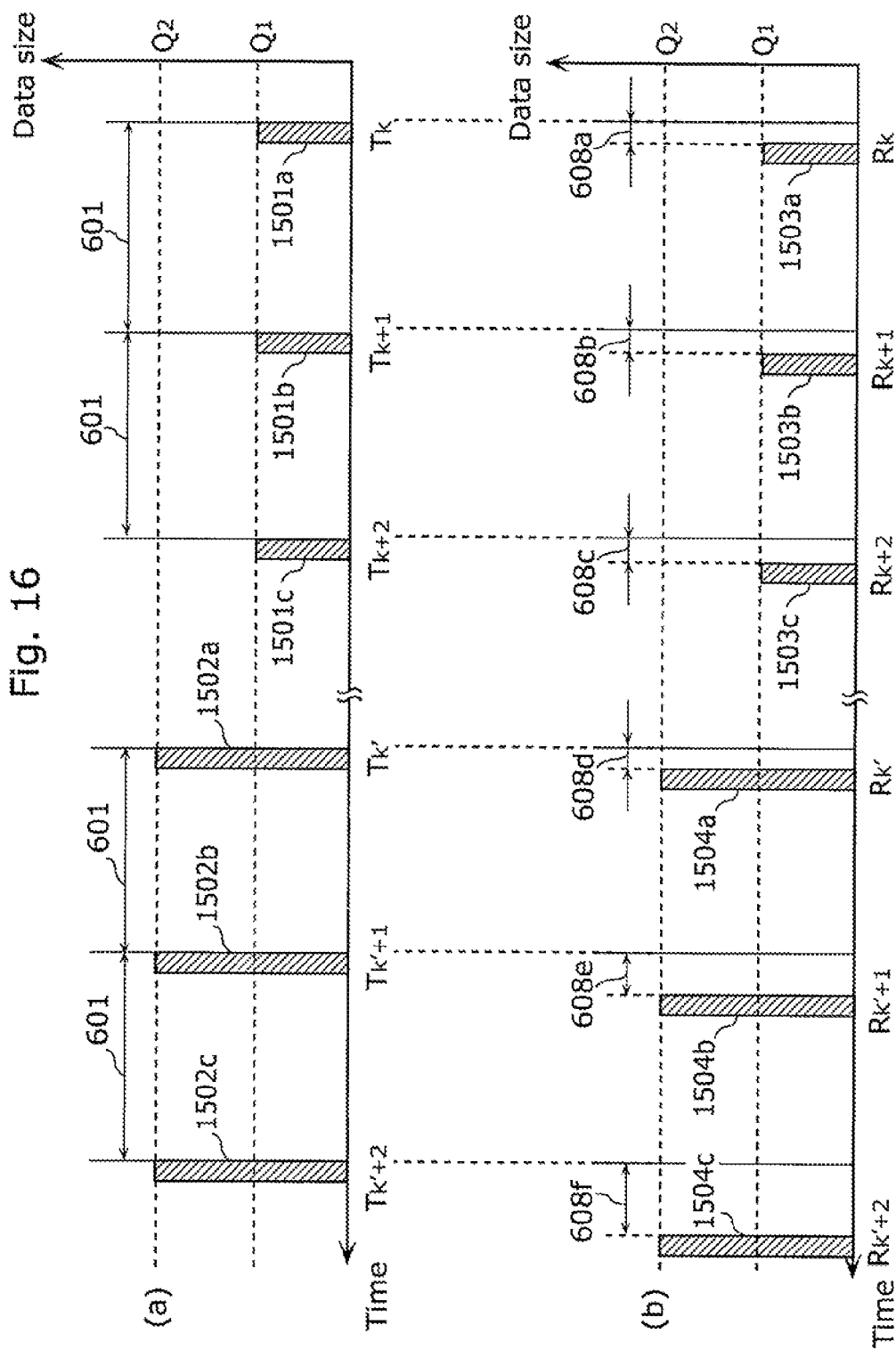
FIG. 16 is a diagram illustrating a packet train in Embodiment 5.

FIG. 16 is a diagram illustrating a packet train in Embodiment 5. More specifically, (a) in FIG. 16 shows the timings at which the packets are transmitted by the transmitting terminal 51. On the other hand, (b) in FIG. 16 shows the timings at which the packets are received by the receiving terminal 32. It is to be noted that, in (a) in FIG. 16, a unit time 601 is the same as the unit time 601 as shown in (a) in FIG. 6, and the same detailed description thereof is not repeated here.

Here, in (a) in FIG. 16, each of the probe packets 1501*a* to 1501*c* as shown in (a) in FIG. 16 denotes a probe packet having a data size $Q_1$, and each of the probe packets 1502*a* to 1502*c* denotes a probe packet having a data size $Q_2$.

As shown in FIG. 15, the transmitting terminal 51 obtains the unit time 601 from the timer unit 201, and obtains the measurement bandwidth determined in the measurement bandwidth range specified by the control unit 221 (S102, S302).

Next, the packet train generating unit 251 calculates the packet size of packets to be transmitted in the unit time, based on the unit time 601 and the determined measurement bandwidth, and generates a packet train composed of the probe packets having the calculated packet size (S602). More specifically, when the unit time is 4 ms, and the measurement bandwidth is 2 Mbps, the packet train generating unit 251 generates a packet train including the probe packets 1501*a* to 1501*c* having a packet size of 1000 bytes.

Next, the transmitting terminal 51 assigns the transmission time information to each of the packets in the generated packet train, and transmits each of the packets in the packet train to the receiving terminal 32 (S106).

Next, the receiving terminal 32 receives the packet train transmitted by the transmitting terminal 51, and judges the availability of the measurement bandwidth, based on one way delays 608*a* to 608*c* of the respective probe packets 1503*a* to 1503*c* as shown in (b) in FIG. 16. Next, the receiving unit 32 adds the result of the judgment to the return information, and transmits the return information to the transmitting terminal 51.

Next, the transmitting terminal 51 receives the return information including the judgment result transmitted from the receiving terminal 32 (S402). The determining unit 241 determines the available bandwidth using the return information (S112), and transmits the determination result to the control unit 221. Next, the control unit 221 decides whether or not to finish the processing or perform a next measurement, based on the determination result (S304).

In the case where the measurement bandwidth determined by the control unit 221 is higher, the packet train generating unit 251 generates a packet train including probe packets having a larger packet size. For example, the packet train generating unit 251 increases the data size of the probe packets in the case where the transmission interval between two of the probe packets is shorter than the unit time that can be measured by the timer unit 201 because of a high measurement bandwidth.

For example, when the unit time is 4 ms and the measurement bandwidth is 4 Mbps as shown in (a) in FIG. 16, the packet train generating unit 251 generates a packet train including the probe packets 1502a to 1502c having a packet size of 2000 bytes.

In this way, as shown in (b) in FIG. 16, the receiving terminal 32 receives the packet train transmitted by the transmitting terminal 51, and judges the availability of the measurement bandwidth, based on the one way delays 608d to 608f of the respective probe packets 1504a to 1504c.

In the example shown here, the packet train generating unit 251 generates a packet train composed only of probe packets. However, it is to be noted that the packet train generating unit 251 may generate a packet train including at least one adjustment packet.

Although Embodiment 5 shows an example having the same process flow as in Embodiment 4, it is also possible to replace the packet train generating unit 222 in Embodiment 2 with the packet train generating unit 251 in Embodiment 5.

Alternatively, it is possible to use, as a specific method of judging the availability of the measurement bandwidth, the example shown in Embodiment 1. It is also possible to use, as a method of searching out the upper limit for the available bandwidth, the example shown in Embodiment 2.

The transmitting terminal 51 can know the maximum value for the bandwidth (available bandwidth) successfully measured as the final result by operating as described in Embodiment 5. As a result, it is possible to estimate the available bandwidth in the network, irrespective of the unit time based on which each of the packets can be controlled.

In this way, the transmitting terminal 51 in Embodiment 5 generates probe packets each having a data size corresponding to the measurement bandwidth, transmits each of the probe packets at the signal cycle corresponding to the unit time, receives the return information, and determines the available bandwidth using the return information. For this reason, it is possible to transmit, at the signal cycle corresponding to the unit time, each of the probe packets each having the data size according to the measurement bandwidth, and receive the return information obtainable based on the reception time of each of the probe packets, thereby calculating the delay time of each of the probe packets. Thus, it is possible to determine the available bandwidth based on the delay time. For this reason, even in the high bandwidth, it is possible to accurately estimate the available bandwidth in the network.

In this way, the transmitting terminal and the receiving terminal according to the present invention make it possible to accurately measure the available bandwidth in a network by performing the measurement using a packet train with consideration of a timer signal cycle (the minimum controllable transmission interval). In other words, even a weak CPU for use in an embedded device accurately transmits probe packets at the minimum controllable transmission intervals. In this way, it is possible to measure delay time more accurately, which makes it possible to measure the available bandwidth more accurately. Furthermore, even a weak CPU for use in an embedded device transmits at least one adjustment packet not for use in the measurement of the delay time and thus no accurate control of the transmission time is performed therefor. In this way, it is possible to accurately measure the availability of a wider bandwidth.

In this way, it is possible to accurately measure the bandwidth in the case of, for example, starting streaming video and audio data, thereby making it possible to perform streaming without producing visual noise and sound stoppage when performing streaming via a best-effort network such as the Internet.

Although the present invention has been described above taking examples of the transmitting terminals and receiving terminals according to Embodiments 1 to 5, the present invention is not limited to these embodiments. Those skilled in the art will readily appreciate that many modifications are possible in the exemplary embodiments and that the structural elements in the different embodiments may be arbitrarily combined to obtain other variations without materially departing from the novel teachings and advantageous effects of the present invention. Accordingly, all such modifications and variations are intended to be included within the scope of the present invention.

In addition, all the above exemplary reference signs are used for illustrating the present invention, and thus these reference signs do not place any restrictions on the present invention.

It is to be noted that the present invention can be implemented not only as the transmitting apparatuses and the receiving apparatuses as described above, but also as a transmitting and receiving system including any one of the pairs of a transmitting apparatus and a receiving apparatus and is intended to estimate an available bandwidth in a network between these two apparatuses. Furthermore, the present invention can be implemented as a method including the steps corresponding to the unique processing units in the transmitting apparatus, the receiving apparatus, and/or the transmitting and receiving system.

Each of the transmitting terminals and receiving terminals according to Embodiment 1 to 5 is implemented as an LSI that is typically an integrated circuit. Each of the functional blocks thereof may be implemented as an independent chip, or some or all of the same may be integrated into a single chip.

Moreover, ways to achieve such integration are not limited to the one using LSI, and a special circuit or a general purpose processor and so forth can also achieve the integration. A Field Programmable Gate Array (FPGA) that can be programmed after manufacturing LSI or a reconfigurable processor that allows re-configuration of the connection or configuration of LSI can be used for the same purpose.

Furthermore, when a circuit integration technology for replacing LSIs with new circuits appears in the future with advancement in semiconductor technology and derivative other technologies, the circuit integration technology may be naturally used to integrate the functional blocks.

Furthermore, some or all of the functions of the transmitting terminals and receiving terminals according to Embodiments 1 to 5 may be implemented by causing a processor such as a CPU etc. to execute the program.

Furthermore, the present invention may be the program, or may be a recording medium having the program recorded thereon. Furthermore, the program can naturally be distributed through recording media such as CD-ROMs etc. and communication media such as the Internet.

INDUSTRIAL APPLICABILITY

A transmitting apparatus, a receiving apparatus, a transmitting and receiving system according to the present invention make it possible to accurately measure a wider available bandwidth, based on the minimum transmission interval that can be accurately controlled by even a weak CPU for use in an embedded device. As a result, even an embedded device such as a television conferencing system can accurately estimate the bandwidth at the time of starting streaming of video and audio data. This makes it possible to perform communication and conversation without producing visual noise and sound stoppage even immediately after the start of the communication, when performing streaming via a best-effort network such as the Internet.

REFERENCE SIGNS LIST 1, 2, 3, 4, 5 Transmitting and receiving system
10 Communication network
11, 21, 31, 41, 51 Transmitting terminal
12, 32 Receiving terminal
201 Timer unit
202, 222, 251 Packet train generating unit
203 Transmitting unit
204 Reception time measuring unit
205 Packet extracting unit
206, 232 Transmitting unit
207, 233 Receiving unit
208, 223, 234, 241 Determining unit
209 Judging unit
221 Control unit
231 Judging unit
601 Unit time
602 to 605 Transmission interval
606a to 606c, 610a to 610c Probe packet
607a to 607f, 611a to 611f Adjustment packet
608a to 608f One way delay
609 Packet train
1501a to 1501c, 1502a to 1502c, 1503a to 1503c, 1504a to 1504c Probe packet

The invention claimed is:

1. A transmitting apparatus that estimates an available bandwidth that is a bandwidth that can be used for data communication with a receiving apparatus, the transmitting apparatus comprising:
a timer unit that generates a signal having a signal cycle corresponding to a predetermined unit time;
a packet train generating unit that generates probe packets each of which is transmitted at the signal cycle corresponding to the unit time indicated by the signal, and generates at least one adjustment packet that is different from any of the probe packets and inserted between two of the probe packets, a number of the at least one adjustment packet generated corresponding to a measurement bandwidth that is a target bandwidth to be measured;
a transmitting unit that transmits, at the signal cycle corresponding to the unit time, each of the probe packets having transmission time information that is information identifying a transmission time, and transmits the at least one adjustment packet between when one of the two probe packets is transmitted and when another of the two probe packets is transmitted;
a receiving unit that receives return information from the receiving apparatus, the return information being obtainable based on a reception time of each of the probe packets received by the receiving apparatus and without being based on a reception time of the at least one adjustment packet; and
a determining unit that determines the available bandwidth, using the received return information.

2. The transmitting apparatus according to claim 1, wherein
the receiving unit receives, from the receiving apparatus, the return information including either information indicating the reception time of each of the probe packets or information indicating a delay time that is a difference between the transmission time and the reception time of each of the probe packets, the determining unit includes a judging unit that judges whether or not the measurement bandwidth is an available bandwidth, using either the information indicating the reception time or the information indicating the delay time included in the received return information, and
the determining unit determines the available bandwidth, based on a result of the judgment by the judging unit.

3. The transmitting apparatus according to claim 1, wherein
the receiving unit receives, from the receiving apparatus, the return information including a result of judging whether or not the measurement bandwidth is the available bandwidth, using the reception time of each of the probe packets, and
the determining unit determines the available bandwidth, based on the judgment result included in the received return information.

4. The transmitting apparatus according to claim 1, wherein the packet train generating unit determines a number of the probe packets to generate and the number of the at least one adjustment packet to generate, according to the unit time and the measurement bandwidth, and generates the determined numbers of the probe packets and the at least one adjustment packet.

5. The transmitting apparatus according to claim 4, further comprising
a controller that determines, each time the determining unit determines the available bandwidth, a next target measurement bandwidth to be measured, based on a result of the determination of the available bandwidth,
wherein the packet train generating unit determines the number of the probe packets to generate and the number of the at least one adjustment packet to generate, each time the controller determines the next target measurement bandwidth, and generates the determined numbers of the probe packets and the at least one adjustment packet,
the transmitting unit transmits the probe packets and the at least one adjustment packet to the receiving apparatus, each time the packet train generating unit generates the probe packets and the at least one adjustment packet,
the receiving unit receives the return information from the receiving apparatus, each time the transmitting unit transmits the probe packets and the at least one adjustment packet, and
the determining unit determines the available bandwidth, each time the receiving unit receives the return information.

6. A transmitting apparatus that estimates an available bandwidth that is a bandwidth that can be used for data communication with a receiving apparatus, the transmitting apparatus comprising:
a timer unit that generates a signal having a signal cycle corresponding to a predetermined unit time;
a packet train generating unit that generates probe packets each of which is transmitted at the signal cycle corresponding to the unit time indicated by the signal, and has a data size corresponding to a measurement bandwidth that is a target bandwidth to be measured;
a transmitting unit that transmits each of the probe packets having transmission time information that is information identifying a transmission time, to the receiving apparatus at the signal cycle corresponding to the unit time;
a receiving unit that receives return information from the receiving apparatus, the return information being obtainable based on a reception time of each of the probe packets received by the receiving apparatus; and a determining unit that determines the available bandwidth, using the received return information.

7. A receiving apparatus that receives a packet train including a plurality of packets from a transmitting apparatus, and is used to estimate an available bandwidth that is a bandwidth that can be used for data communication with the transmitting apparatus, the receiving apparatus comprising:

a reception time measuring unit that measures at least a reception time of each of probe packets which (i) are included in the plurality of packets, (ii) are transmitted at a signal cycle corresponding to a predetermined unit time, and (iii) include transmission time information that is information identifying a transmission time, the plurality of packets also including at least one adjustment packet (i) which is different from any of the probe packets, (ii) which is inserted between two of the probe packets, and (iii) a number of which corresponds to a measurement bandwidth that is a target bandwidth to be measured;

a packet extracting unit that extracts the probe packets from among the plurality of packets including the probe packets and the at least one adjustment packet; and a transmitting unit that returns return information to the transmitting apparatus, the return information being obtainable based on the reception time of each of the probe packets and without being based on a reception time of the at least one adjustment packet, and is for determining the available bandwidth.

8. The receiving apparatus according to claim 7, wherein the transmitting unit returns, to the transmitting apparatus, the return information including either information indicating the reception time of each of the probe packets or information indicating a delay time that is a difference between the transmission time and the reception time of each of the probe packets.

9. The receiving apparatus according to claim 7, further comprising a judging unit that judges whether or not the measurement bandwidth that is the target bandwidth to be measured is the available bandwidth, based on a delay time that is a difference between the transmission time and the reception time of each of the probe packets extracted by the packet extracting unit, wherein the transmitting unit returns, to the transmitting apparatus, the return information including a result of the judgment by the judging unit.

10. A transmitting and receiving system that estimates an available bandwidth that is a bandwidth that can be used for data communication between a transmitting apparatus and a receiving apparatus, the transmitting and receiving system comprising:

a transmitting apparatus comprising:

a timer unit that generates a signal having a signal cycle corresponding to a predetermined unit time;

a packet train generating unit that generates probe packets each of which is transmitted at the signal cycle corresponding to the unit time indicated by the signal, and generates at least one adjustment packet that is different from any of the probe packets and inserted between two of the probe packets, a number of the at least one adjustment packet generated corresponding to a measurement bandwidth that is a target bandwidth to be measured;

a transmitting unit that transmits, at the signal cycle corresponding to the unit time, each of the probe packets having transmission time information that is information identifying a transmission time, and transmits the at least one adjustment packet between when one of the two probe packets is transmitted and when another of the two probe packets is transmitted;

a receiving unit that receives return information from the receiving apparatus, the return information being obtainable based on a reception time of each of the probe packets received by the receiving apparatus and without being based on a reception time of the at least one adjustment packet; and a determining unit that determines the available bandwidth, using the received return information; and a receiving apparatus that receives the probe packets and the at least one adjustment packet from the transmitting apparatus, the receiving apparatus comprising:

a reception time measuring unit that measures at least the reception time of each of probe packets;

a packet extracting unit that extracts the probe packets from among the received probe packets and at least one adjustment packet; and a transmitting unit that returns the return information to the transmitting apparatus, the return information being obtainable based on the reception time of each of the probe packets and without being based on the reception time of the at least one adjustment packet, and is for determining the available bandwidth.

11. A transmitting method performed by a transmitting apparatus to estimate an available bandwidth that is a bandwidth corresponding to a transmission speed that can be used for data communication with a receiving apparatus, the transmitting method comprising:

generating a signal having a signal cycle corresponding to a predetermined unit time;

generating probe packets each of which is transmitted at the signal cycle corresponding to the unit time indicated by the signal, and generating at least one adjustment packet that is different from any of the probe packets and inserted between two of the probe packets, a number of the at least one adjustment packet generated corresponding to a measurement bandwidth that is a target bandwidth to be measured;

transmitting, at the signal cycle corresponding to the unit time, each of the probe packets having transmission time information that is information identifying a transmission time, and transmitting the at least one adjustment packet between when one of the two probe packets is transmitted and when another of the two probe packets is transmitted;

receiving return information from the receiving apparatus, the return information being obtainable based on a reception time of each of the probe packets received by the receiving apparatus and without being based on a reception time of the at least one adjustment packet; and determining the available bandwidth, using the received return information.

12. A receiving method performed by a receiving apparatus that receives a packet train including a plurality of packets from a transmitting apparatus, the receiving method being performed to estimate an available bandwidth that is a bandwidth that can be used for data communication with the transmitting apparatus, the receiving method comprising:

measuring at least a reception time of each of probe packets which (i) are included in the plurality of packets, (ii) are transmitted at a signal cycle corresponding to a predetermined unit time, and (iii) include transmission time information that is information identifying a transmission time, the plurality of packets also including at least one adjustment packet (i) which is different from any of the probe packets, (ii) which is inserted between two of the probe packets, and (iii) a number of which corresponds to a measurement bandwidth that is a target bandwidth to be measured;

extracting the probe packets from among the plurality of packets including the probe packets and the at least one adjustment packet; and returning return information to the transmitting apparatus, the return information being obtainable based on the reception time of each of the probe packets and without being based on a reception time of the at least one adjustment packet, and is for determining the available bandwidth.

13. A transmitting and receiving method for estimating an available bandwidth that is a bandwidth that can be used for data communication between a transmitting apparatus and a receiving apparatus, the transmitting and receiving method comprising:

generating a timer signal that is a signal having a signal cycle corresponding to a predetermined unit time, the generating being performed by the transmitting apparatus;

generating probe packets each of which is transmitted at the signal cycle corresponding to the unit time, and generating at least one adjustment packet that is different from any of the probe packets and inserted between two of the probe packets, a number of the at least one adjustment packet generated corresponding to a measurement bandwidth that is a target bandwidth to be measured, the generating being performed by the transmitting apparatus;

transmitting, at the signal cycle corresponding to the unit time, each of the probe packets having transmission time information that is information identifying a transmission time, and transmitting the at least one adjustment packet between when one of the two probe packets is transmitted and another of the two probe packets is transmitted, the transmitting being performed by the transmitting apparatus;

measuring at least a reception time of each of the probe packets, the measuring being performed by the receiving apparatus;

extracting the probe packets from among the probe packets and the at least one adjustment packet, the extracting being performed by the receiving apparatus;

returning return information to the transmitting apparatus, the return information being obtainable based on the reception time of each of the probe packets and without being based on a reception time of the at least one adjustment packet, the returning being performed by the receiving apparatus;

receiving the return information from the receiving apparatus, the returning being performed by the transmitting apparatus; and determining the available bandwidth, using the received return information, the determining being performed by the transmitting apparatus.

14. A non-transitory computer-readable recording medium having stored thereon a computer program that causes a computer to execute a transmitting method for estimating an available bandwidth that is a bandwidth corresponding to a transmission speed that can be used for data communication with a receiving apparatus, the transmitting method comprising:

generating a signal having a signal cycle corresponding to a predetermined unit time generating probe packets each of which is transmitted at the signal cycle corresponding to the unit time indicated by the signal, and generating at least one adjustment packet that is different from any of the probe packets and inserted between two of the probe packets, a number of the at least one adjustment packet generated corresponding to a measurement bandwidth that is a target bandwidth to be measured;

transmitting, at the signal cycle corresponding to the unit time, each of the probe packets having transmission time information that is information identifying a transmission time, and transmitting the at least one adjustment packet between when one of the two probe packets is transmitted and when another of the two probe packets is transmitted;

receiving return information from the receiving apparatus, the return information being obtainable based on a reception time of each of the probe packets received by the receiving apparatus and without being based on a reception time of the at least one adjustment packet; and determining the available bandwidth, using the received return information.

15. A non-transitory computer-readable recording medium having stored thereon a computer program that causes a computer to execute a receiving method for receiving a packet train including a plurality of packets from a transmitting apparatus, the receiving method being performed to estimate an available bandwidth that is a bandwidth that can be used for data communication with the transmitting apparatus, the receiving method comprising:

measuring at least a reception time of each of probe packets which (i) are included in the plurality of packets, (ii) are transmitted at a signal cycle corresponding to a predetermined unit time, and (iii) include transmission time information that is information identifying a transmission time, the plurality of packets also including at least one adjustment packet (i) which is different from any of the probe packets, (ii) which is inserted between two of the probe packets, and (iii) a number of which corresponds to a measurement bandwidth that is a target bandwidth to be measured;

extracting the probe packets from among the plurality of packets including the probe packets and the at least one adjustment packet; and returning return information to the transmitting apparatus, the return information being obtainable based on the reception time of each of the probe packets and without being based on a reception time of the at least one adjustment packet, and is for determining the available bandwidth.

* * * * *